United States Patent
Ashizawa et al.

(10) Patent No.: US 10,418,636 B2
(45) Date of Patent: Sep. 17, 2019

(54) CURRENT-COLLECTOR METAL FOIL, CURRENT COLLECTOR, AND CURRENT-COLLECTOR-METAL-FOIL MANUFACTURING METHOD

(71) Applicant: UACJ Corporation, Tokyo (JP)

(72) Inventors: Koichi Ashizawa, Aichi (JP); Tetsuya Motoi, Aichi (JP); Atsushi Koishikawa, Aichi (JP); Yasushi Funato, Aichi (JP)

(73) Assignee: UACJ CORPORATION, Tokyo (JP)

( * ) Notice: Subject to any disclaimer, the term of this patent is extended or adjusted under 35 U.S.C. 154(b) by 7 days.

(21) Appl. No.: 15/316,086

(22) PCT Filed: Jun. 3, 2015

(86) PCT No.: PCT/JP2015/066085
§ 371 (c)(1),
(2) Date: Dec. 2, 2016

(87) PCT Pub. No.: WO2015/186752
PCT Pub. Date: Dec. 10, 2015

(65) Prior Publication Data
US 2017/0092955 A1    Mar. 30, 2017

(30) Foreign Application Priority Data

Jun. 6, 2014  (JP) .................................. 2014-117769

(51) Int. Cl.
*H01M 4/66* (2006.01)
*H01G 11/70* (2013.01)
(Continued)

(52) U.S. Cl.
CPC .............. *H01M 4/661* (2013.01); *B30B 3/00* (2013.01); *C25D 1/04* (2013.01); *C25D 3/08* (2013.01);
(Continued)

(58) Field of Classification Search
None
See application file for complete search history.

(56) References Cited

U.S. PATENT DOCUMENTS

| | | |
|---|---|---|
| 3,855,136 A | 12/1974 | Howard et al. |
| 4,223,047 A | 9/1980 | Pappert et al. |

(Continued)

FOREIGN PATENT DOCUMENTS

| | | |
|---|---|---|
| CN | 102317510 A | 1/2012 |
| CN | 103314474 A | 9/2013 |

(Continued)

OTHER PUBLICATIONS

English translation of International Search Report from parent application No. PCT/JP2015/066085.

(Continued)

*Primary Examiner* — Amanda J Barrow
(74) *Attorney, Agent, or Firm* — J-Tek Law PLLC; Jeffrey D. Tekanic; Scott T. Wakeman

(57) ABSTRACT

A current-collector metal foil has at least at least one roughened surface and numerous recessed parts are present on the roughened surface. Each recessed part has an edge part that surrounds a bottom-surface part and is raised above the bottom-surface part. The average Feret diameter $L_{ave}$ of the recessed parts is 0.5-50 μm. The current-collector metal foil is suitable for use, e.g., as an electrode current collector for a lithium-ion secondary battery, a sodium secondary battery, an electric double-layer capacitor, or a lithium-ion capacitor.

15 Claims, 5 Drawing Sheets

(51) Int. Cl.
| | |
|---|---|
| *C25D 7/06* | (2006.01) |
| *H01M 10/0525* | (2010.01) |
| *H01M 10/054* | (2010.01) |
| *C25D 3/56* | (2006.01) |
| *H01G 11/86* | (2013.01) |
| *H01G 11/68* | (2013.01) |
| *B30B 3/00* | (2006.01) |
| *C25D 7/00* | (2006.01) |
| *H01M 4/64* | (2006.01) |
| *H01M 4/70* | (2006.01) |
| *C25D 1/04* | (2006.01) |
| *C25D 3/08* | (2006.01) |
| *C25D 5/48* | (2006.01) |
| *H01M 4/02* | (2006.01) |

(52) U.S. Cl.
CPC ................ *C25D 3/56* (2013.01); *C25D 5/48* (2013.01); *C25D 7/00* (2013.01); *C25D 7/0614* (2013.01); *H01G 11/68* (2013.01); *H01G 11/70* (2013.01); *H01G 11/86* (2013.01); *H01M 4/64* (2013.01); *H01M 4/70* (2013.01); *H01M 10/054* (2013.01); *H01M 10/0525* (2013.01); *H01M 2004/021* (2013.01); *Y02E 60/13* (2013.01)

(56) References Cited

U.S. PATENT DOCUMENTS

| | | | | |
|---|---|---|---|---|
| 4,917,962 | A * | 4/1990 | Crahay | B21B 1/227 428/600 |
| 6,038,124 | A | 3/2000 | Uchi et al. | |
| 6,195,251 | B1 | 2/2001 | Suhara et al. | |
| 6,274,242 | B1 | 8/2001 | Onodera et al. | |
| 2005/0112469 | A1 | 5/2005 | Goto et al. | |
| 2005/0159281 | A1 * | 7/2005 | Nishino | C25D 5/36 492/1 |
| 2005/0233066 | A1 | 10/2005 | Sunagawa et al. | |
| 2010/0084266 | A1 * | 4/2010 | Di Franco | C25B 11/00 204/290.01 |
| 2010/0112452 | A1 * | 5/2010 | Nishimura | H01M 4/661 429/231.95 |
| 2010/0167111 | A1 | 7/2010 | Sumihara et al. | |
| 2011/0277524 | A1 | 11/2011 | Ichimoto et al. | |
| 2014/0017564 | A1 | 1/2014 | Suzuki et al. | |
| 2015/0099170 | A1 * | 4/2015 | Motoi | H01M 4/661 429/217 |

FOREIGN PATENT DOCUMENTS

| | | | | |
|---|---|---|---|---|
| JP | H08-174015 | * | 7/1996 | ............. B21B 27/00 |
| JP | H11135368 A | | 5/1999 | |
| JP | H11162470 A | | 6/1999 | |
| JP | 2003051313 A | | 2/2003 | |
| JP | 2005002371 A | | 1/2005 | |
| JP | 2005158397 A | | 6/2005 | |
| JP | 2005310502 A | | 11/2005 | |
| JP | 2008159297 A | | 7/2008 | |
| JP | 2008270004 A | | 11/2008 | |
| JP | 2008282797 A | | 11/2008 | |
| JP | 2009231263 A | | 10/2009 | |
| JP | 2010150637 A | | 7/2010 | |
| JP | 2011-165637 | * | 8/2011 | ............. H01M 4/70 |
| JP | 2011216336 A | | 10/2011 | |
| JP | 2013110049 A | | 6/2013 | |
| WO | 2013128685 A1 | | 9/2013 | |
| WO | WO 2013/12865 | * | 9/2013 | ............. H01M 4/66 |

OTHER PUBLICATIONS

English translation of Japanese Industrial Standard (JIS) B 0601:2013.
English translation of Written Opinion of the International Searching Authority from parent application No. PCT/JP2015/066085.
Office Action from the Japanese Patent Office dated Jan. 8, 2019 in counterpart Japanese application No. 2016-525215, and machine translation thereof.
Office Action from the Chinese Patent Office dated Apr. 26, 2019 in counterpart Chinese application No. 201580025706.6, and translation thereof.
Office Action and Search Report from the Chinese Patent Office dated Aug. 28, 2018 in counterpart Chinese application No. 201580025706.6, and machine translation thereof.

* cited by examiner

CURRENT-COLLECTOR METAL FOIL, CURRENT COLLECTOR, AND CURRENT-COLLECTOR-METAL-FOIL MANUFACTURING METHOD

CROSS-REFERENCE

This application is the US national stage of International Patent Application No. PCT/JP2015/066085 filed on Jun. 3, 2015, which claims priority to Japanese Patent Application No. 2014-117769 filed on Jun. 6, 2014.

TECHNICAL FIELD

The present invention relates to a current-collector metal foil, a current collector, and a current-collector-metal-foil manufacturing method.

BACKGROUND ART

A current collector, which is used in devices such as secondary batteries and capacitors, is configured by affixing an electrode active material to the surface of a metal foil.

For example, in a negative-electrode current collector of a lithium-ion secondary battery, a coating layer is formed by applying a slurry—which is prepared by mixing and dispersing a negative-electrode active material composed of a carbon powder, a binding agent, an electrically conductive agent, and the like into a solvent—to a metal foil, and subsequently removing the solvent by drying the coating layer. Subsequently, a pressure-bonding process is performed, as needed, to increase the intralayer density of the negative-electrode active material. In so doing, a negative-electrode current collector having an active-material-containing layer on the surface of a metal foil can be prepared.

The adherence of the active material to the metal foil in the current collector greatly affects the performance of a device. That is, if the active material were to come off of the metal foil, it could lead to problems, such as a decrease in capacity, a decrease in charging-discharging characteristics, a short circuit between the electrodes, or the like, and thereby become a cause that reduces the performance of the device. In addition, if the active material comes off of the metal foil easily, then there is a risk that it will become difficult to maintain the performance of the device over the long term.

As a method that increases the adherence of an active material to a metal foil, a method that roughens the surface of the metal foil is known. For example, Patent Document 1 discloses an aluminum foil for a current collector in which, as the roughness of at least one surface, the mean roughness Ra according to JIS B 0601:1994 is 0.3 µm or more and 1.5 µm or less and the maximum height Ry is 0.5 µm or more and 5.0 µm or less.

PRIOR ART LITERATURE

Patent Documents

Patent Document 1
Japanese Laid-open Patent Publication H11-162470

SUMMARY OF THE INVENTION

Nevertheless, the present situation is that, in metal foils manufactured using preexisting techniques, adherence to an active material is still insufficient, and there is a demand for further improvement. In particular, if a powdered active material is used, then the adherence of the active material to the metal foil tends to decrease.

The present invention was conceived considering the above-mentioned background, and an object of the present invention is to provide a current-collector metal foil that can maintain satisfactory performance over the long term, a method of manufacturing the same, and a current collector in which the above-mentioned metal foil is used.

A first aspect of the invention is a current-collector metal foil, at least one surface of which has been roughened, wherein:
numerous recessed parts, each having a bottom-surface part and an edge part, which surrounds the bottom-surface part and is raised above the bottom-surface part, are present on the roughened surface; and
the average Feret diameter $L_{ave}$ of the recessed parts is 0.5 µm or more and 50 µm or less.

Another aspect of the invention is a current collector, having an active-material-containing layer on the roughened surface of the above-mentioned current-collector metal foil, wherein the average aggregated particle size $d_{ave}$ of active material contained in the active-material-containing layer is 0.5 µm or more and 50 µm or less.

Yet another aspect of the invention is a current-collector-metal-foil manufacturing method, comprising:
preparing a pair of roughening rolls in advance by:
forming a chrome-plated film, having numerous protruding parts, by performing a plating treatment on a roughened surface of at least one roll of a pair of rolls; and subsequently forming flat surfaces by flattening peak parts of the protruding parts on the chrome-plated film; and
performing a transfer process in which a metal foil is passed, one or more times, between the pair of roughening rolls to transfer the contours of the roughening rolls, thereby forming numerous recessed parts on the surface(s), each recessed part having a bottom-surface part that is sunken down more than the periphery and an edge part that surrounds the bottom-surface part and is raised above the bottom-surface part, and thus roughening the metal foil such that the average Feret diameter $L_{ave}$ of the recessed parts is 0.5 µm or more and 50 µm or less.

The above-mentioned current-collector metal foil (hereinbelow, may be called the "metal foil" where appropriate) comprises, on the above-mentioned roughened surface(s), numerous recessed parts, each recessed part having a bottom-surface part and an edge part, which surrounds the bottom-surface part and is raised above the bottom-surface part, and the average Feret diameter $L_{ave}$ of the above-mentioned recessed parts is 0.5 µm or more and 50 µm or less. Active-material particles, which have a dimension approximately the same as a dimension of the above-mentioned recessed parts, tend to fit in the above-mentioned recessed parts, which have the above-mentioned specific shape and dimension(s). Furthermore, in the state in which an active-material particle is fitted in an above-mentioned recessed part, because the contact area of the above-mentioned edge part with the active-material particle tends to form a continuous line shape, the active-material particles tend not to peel off of the above-mentioned metal foil. Therefore, in the above-mentioned metal foil, the adherence of the active material can be increased and it is possible to ensure that the active material tends not to peel off.

In addition, in the state in which active-material particles are fitted in the above-mentioned recessed parts, the surface area of the contact areas of the above-mentioned edge parts with the active-material particles is large compared with conventional metal foils. Therefore, in the above-mentioned metal foil, the contact resistance with the active material can be reduced.

As described above, in the above-mentioned metal foil, the active material tends not to peel off and the contact resistance with the active material can be decreased. Therefore, the above-mentioned metal foil can maintain, over the long term, a satisfactory electrical connection with the active material.

In addition, the above-mentioned current collector has an above-mentioned active-material-containing layer on a roughened surface of the above-mentioned metal foil, and the average aggregated particle size $d_{ave}$ of the active material contained in the above-mentioned active-material-containing layer is 0.5 μm or more and 50 μm or less. Consequently, in the above-mentioned current collector, the particles of the above-mentioned active material tend to fit in the above-mentioned recessed parts, peeling of the above-mentioned active-material-containing layer can be reduced, and the contact resistance between the active material and the above-mentioned metal foil can be reduced. In addition, in devices such as secondary batteries and capacitors in which the above-mentioned current collector is used as an electrode, the electrode resistance originating from the above-mentioned low contact resistance can be easily reduced. As a result, the charging-discharging characteristics of the device can be improved, and charging and discharging can be performed at a high rate. In addition, because the device in which the above-mentioned current collector is used has the high adherence described above, high performance can be maintained over the long term.

In addition, in the above-mentioned current-collector-metal-foil manufacturing method, the above-mentioned metal foil can be prepared by transferring the contours of the above-mentioned pair of roughening rolls. The above-mentioned manufacturing method can control the contour of the above-mentioned metal foil with good reproducibility by using a technique called transfer. Consequently, as long as the contours of the above-mentioned roughening rolls are controlled, the shape and arrangement of the above-mentioned recessed parts easily can be made uniform over the entire length of the metal foil. As a result, the above-mentioned metal foil, having excellent quality, can be easily prepared. In addition, because the process of transferring the contours of the above-mentioned roughening rolls can be easily incorporated into preexisting metal-foil-manufacturing processes, the method of manufacturing the above-mentioned metal foil can be simplified and productivity can be increased.

DETAILED DESCRIPTION

[Current-Collector Metal Foil]

Figure 1:
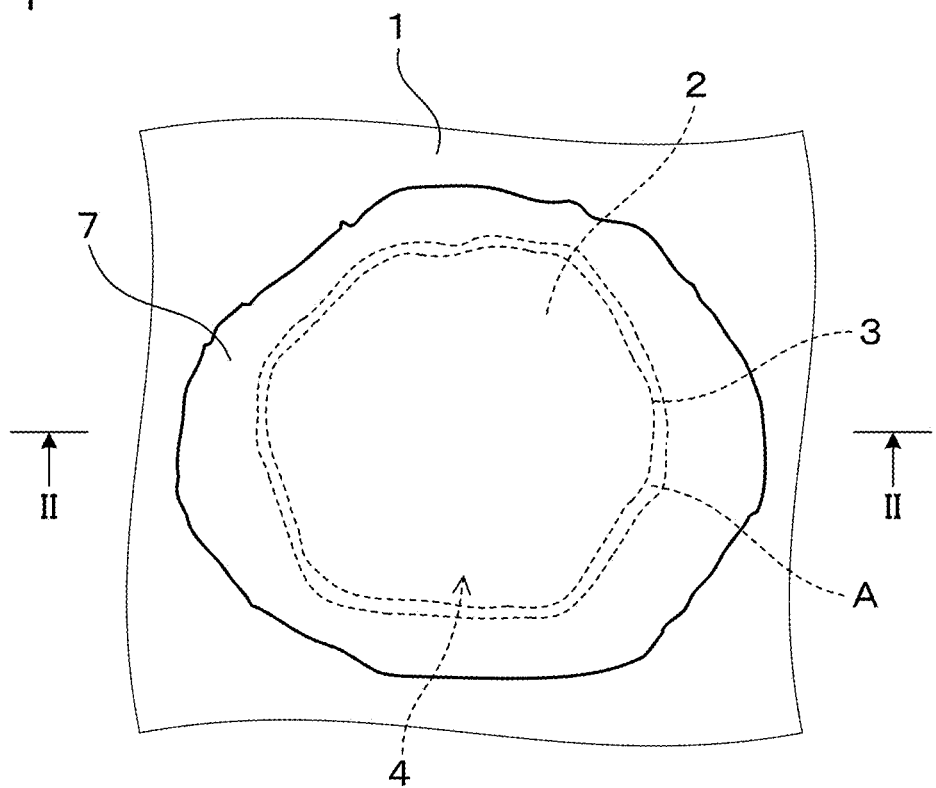
FIG. 1 is a top view that shows, according to a working example, one example of the state in which an active-material particle is fitted in a recessed part of a metal foil.

Metals used in conventional current collectors can be utilized as the material of the above-mentioned metal foil. For example, aluminum, stainless steel, or the like can be used as the metal foil used in a positive-electrode current collector of a lithium-ion secondary battery or a lithium-ion capacitor. In addition, copper, copper alloys, stainless steel, nickel, iron, or the like can be used as the metal foil used in a negative-electrode current collector. In addition, in either the positive-electrode current collector or the negative-electrode current collector, aluminum, copper, copper alloys, stainless steel, nickel, iron, or the like can be used as the metal foil used in the current collector of an electric double-layer capacitor. It is noted that the above-mentioned "aluminum" includes aluminum alloys.

Specifically, a 1000-series aluminum alloy, a 3000-series aluminum alloy, an 8000-series aluminum alloy, and the like can be used as the aluminum. In addition, oxygen-free copper, tough-pitch copper, or the like can be used as the copper. In addition, copper alloys, such as Cu—Sn (copper-tin)-based, Cu—Ag (copper-silver)-based, Cu—Zn (copper-zinc)-based, Cu—Cr (copper-chrome)-based, and Cu—Zr (copper-zirconium)-based alloys, can be used as the copper alloy. In addition, for example, an SUS304 stainless-steel alloy, an SUS316 stainless-steel alloy, or the like can be used as the stainless steel.

The above-mentioned metal foil preferably is composed of aluminum, copper, or a copper alloy. These metals have high corrosion resistance when used in a positive-electrode current collector. In addition, if used in a negative-electrode current collector of a lithium-ion secondary battery or the like, these metals are ideally suited because they tend not to embrittle owing to doping of lithium ions contained in the electrolytic solution. In addition, because these metals usually have high electrical conductivity, they are ideally suited to applications in which charging and discharging are performed at a high rate. It is noted that, because the electrical conductivity of stainless steel is low compared with aluminum and the like, stainless steel is unsuitable for applications in which charging and discharging are performed at a high rate. Nevertheless, a metal foil composed of stainless steel has advantages from the standpoint of manufacturing, such as the ability to perform laser welding in the process of manufacturing a device; consequently, a superior current collector can be obtained in, for example, a device in which laser welding is required.

In addition, the above-mentioned metal foil is composed of copper or a copper alloy and it is particularly preferable to use such in a negative electrode. Until now, it has been difficult to increase adherence to an active-material-containing layer in a negative-electrode current collector in which a metal foil, composed of copper, a copper alloy, or the like, is used, and this difficulty has been a factor in the deterioration of the lifespan of secondary batteries, capacitors, and the like. On the other hand, in the above-mentioned metal foil, because the adherence to the active-material-containing layer can be increased as described above, superior charging-discharging characteristics can be maintained over the long term. As a result, the lifespan of secondary batteries, capacitors, and the like can be extended.

The above-mentioned metal foil preferably has a thickness of 5-35 µm. By virtue of the above-mentioned metal foil having a thickness of 5 µm or more, cracks and the like tend not to occur when recessed parts are formed on the surface, which tends to contribute to increasing the adherence of the active material. In addition, by virtue of the above-mentioned thickness being set to 35 µm or less, the volume, the weight, and the like of the above-mentioned metal foil can be made comparatively small, which makes it easier to reduce the size and weight of the device that incorporates the above-mentioned current collector. From a similar viewpoint, the above-mentioned metal foil more preferably has a thickness of 8-18 µm.

In the above-mentioned metal foil, one surface alone may be roughened or both surfaces may be roughened. The recessed parts, which are present in a numerous amount on the roughened surface(s), each have a bottom-surface part and an edge part, which surrounds the bottom-surface part, as described above. That is, each recessed part exhibits a crater shape that is demarcated by the closed-curve-shaped edge part. Thus, an active-material particle easily fits in a recessed part that exhibits a crater shape. Furthermore, in the state in which an active-material particle is fitted in a recessed part, the active-material particle is supported by the edge part, which is present at the outer edge of the recessed part; consequently, the contact area of the edge part with the active-material particle tends to form a continuous line shape. Therefore, as described above, the adherence of the active material can be increased and the contact resistance between the active material and the metal foil can be decreased.

The average Feret diameter $L_{ave}$ of the recessed part is 0.5 µm or more and 50 µm or less. The average Feret diameter $L_{ave}$ is determined as follows. First, the surface of the metal foil is observed using a microscope at a magnification of 2,000 times, and an image of the surface is obtained. Next, an X axis and a Y axis, which is orthogonal to the X axis, are set virtually in the above-mentioned image, and the length $L_x$ in the X axial direction and the length $L_y$ in the Y axial direction are calculated for each recessed part present in the above-mentioned image. The value obtained by averaging all the $L_x$ values and the $L_y$ values, obtained based on the above, is taken as the average Feret diameter $L_{ave}$. The above processing may be performed using an image-analyzing apparatus or the like. In the present application, the image of the surface of each metal foil was obtained by a "VHX-5000" microscope manufactured by Keyence Corporation, and the calculation of $L_{ave}$ was performed using the image-analyzing apparatus that comes with the apparatus. It is noted that the orientations of the virtually set X axis and Y axis in the above-mentioned method are not particularly limited.

The surface area occupied by the recessed parts on the roughened surface can be appropriately set in accordance with the desired characteristics, the type of active material used, and the like. For example, if an active material in which the average aggregated particle size $d_{ave}$ is 0.5 µm or more and 50 µm or less is used, then the effect of increasing the adherence and the effect of decreasing the contact resistance can be sufficiently obtained by setting the percentage of the surface area of the above-mentioned metal foil that is occupied by the bottom-surface parts to 30%-90%.

In addition, among the numerous recessed parts, 90% or more of the recessed parts preferably have a depth of 2.5 µm or less. Here, the depth of each individual recessed part is defined as the height from the lowermost point of the bottom-surface part to the uppermost point of the edge part. If the depth of the recessed part is excessively deep, then the strength of the metal foil will decrease locally because the thickness of the above-mentioned metal foil becomes thin locally. Consequently, if the proportion of deep recessed parts becomes great, then there is a risk that it will lead to problems such as the occurrence of cracks. Such problems can be avoided by controlling the depth distribution of the recessed parts as described above.

On the other hand, if the depth of a recessed part is excessively shallow, then it will become easy for an active-material particle to contact the bottom-surface part; as a result, the active-material particle will tend to rise above the edge part. Consequently, if the proportion of shallow recessed parts becomes large, then there is a risk that it will become difficult for the active-material particles to fit in the recessed parts, and consequently the effect of increasing the adherence and the effect of decreasing the contact resistance will become inadequate. From the viewpoint of avoiding such problems, it is more preferable that 90% or more of the recessed parts have a depth of 0.5 µm or more.

Various embodiments can be effected with respect to the shape(s) and arrangement(s) of the individual recessed parts. For example, the recessed parts can, in top view, be shaped substantially circularly, substantially elliptically, or the like. In addition, the recessed parts may be arranged irregularly, or may be arranged regularly in a grid. It is noted that the above-mentioned substantially circular shape, substantially elliptical shape, and the like include shapes distorted to a degree that they can still be recognized in the general sense as a circular shape or an elliptical shape.

In each recessed part, at least part of the edge part preferably exhibits, in top view, a substantially arcuate shape. That is, each recessed part preferably exhibits a substantially circular or substantially elliptical crater shape, a shape in which those shapes overlap, or the like. In this case, in the state in which an active-material particle is fitted in a recessed part, the surface area of the contact area of the edge part with the active-material particle tends to be larger. Therefore, in the above-mentioned metal foil, the adherence of the active material can be further increased and the contact resistance can be further decreased.

[Current-Collector-Metal-Foil Manufacturing Method]

The above-mentioned metal foil can be prepared by using a pair of roughening rolls, which are prepared in advance, to perform a transfer process in which the contours of the roughening rolls are transferred to the metal foil.

(Preparation of Roughening Rolls)

The pair of roughening rolls can be prepared by performing a roughening treatment on at least one of the rolls, subsequently performing a plating treatment on the roughened surface(s) to form a chrome-plated film having numerous protruding parts, and then flattening the peak parts of protruding parts on the chrome-plated film. For example, embossing rolls, rolling rolls, or the like can be used as the rolls used in the preparation of the roughening rolls. The roughening treatment and the formation of the chrome-plated film may be performed on just one roll of the pair of rolls or may be performed on both rolls.

The roughening treatment of the rolls can be performed by a technique such as, for example, sandblasting, liquid honing, shot peening, electrical discharge machining, laser texturing, fine powder thermal spraying, or the like. In addition, for example, the various mechanical methods, chemical methods, and physical methods mentioned below can be utilized as a method other than the method described above. Methods in which the foil surface is roughened by, for example, rubbing the foil surface with an abrasive paper such as emery paper, using a blasting process such as sandblasting, or the like can be given as examples of a mechanical method. In addition, methods in which etching is performed using an acid or the like can be given as examples of a chemical method. In addition, methods in which the surface is roughened by ions colliding with the surface, such as in sputtering, can be given as examples of a physical method. These methods can be used singly or in combination.

After the roughening treatment, a chrome-plating treatment is performed on the surface of each roll to form a chrome-plated film. The chrome-plating treatment can be performed using a method and conditions well known in the art such as, for example, an electroplating method.

The chrome-plated film formed on the surface of each roll has numerous protruding parts that protrude in a substantially spherical shape. By flattening the peak parts of these protruding parts, shapes can be formed that correspond to the recessed parts that exhibit crater shapes. An exemplary method of flattening the above-mentioned peak parts includes rolling the above-mentioned rolls on a metal foil. That is, the above-mentioned peak parts are smashed flat by the load applied when the above-mentioned rolls are rolled on the metal foil, which makes it possible to form flat surfaces on the above-mentioned peak parts. It is noted that the material of the metal foil used in the process of flattening the peak parts is not particularly limited. The above-mentioned pair of roughening rolls can be obtained according to the above.

(Transfer Process)

The shapes of the above-mentioned protruding parts are transferred to the surfaces of the metal foil by performing a process in which the metal foil is passed, one or more times, between the pair of roughening rolls obtained as mentioned above, thereby transferring the contours of the roughening rolls to the metal foil. As a result, the recessed parts are formed on the surface of the metal foil, thereby roughening the metal foil. In the transfer process, the number of passes that the metal foil passes between the pair of roughening rolls can be appropriately set in accordance with the characteristics of the metal foil to be obtained. That is, by increasing the number of times that the metal foil passes between the pair of roughening rolls, more numerous recessed parts can be formed.

[Current Collector]

Examples of the configuration of a current collector in which the above-mentioned metal foil is used are explained below. In the current collector, the roughened surface(s) of the above-mentioned metal foil has (have) an active-material-containing layer that contains the active material. The average aggregated particle size $d_{ave}$ of the active material is preferably 0.5 µm or more and 50 µm or less. If each active-material particle has a particle size equivalent to the dimension(s) of each recessed part or a particle size that is slightly larger than the recessed part, then the active-material particle tends to fit in the recessed part. By using an active material having an average aggregated particle size $d_{ave}$ in the above-mentioned specific range, active-material particles having particle sizes equivalent to the dimension(s) of the recessed parts are included in a numerous amount in the active-material-containing layer, which makes it possible to sufficiently obtain the effect of increasing the adherence and the effect of decreasing the contact resistance. It is noted that the average aggregated particle size $d_{ave}$ of the active material is defined as the value of the particle size (D50) for which, in a particle-size distribution obtained using a laser-diffraction-type, particle-size-distribution measuring apparatus, the cumulative frequency is 50% by volume percent.

The active-material-containing layer contains at least the active material and a binding agent; an electrical-conductivity additive may be used as needed. For example, if the above-mentioned current collector is to be configured for use as the negative electrode of a lithium-ion secondary battery, then it is possible to use an active material well known in the art, such as: a simple substance such as silicon, tin, germanium, or the like; oxides or alloys thereof; a carbon material; lithium titanate; or the like. In addition, it is possible to use, for example, polyvinylidene fluoride (PVDF), a water-soluble, acrylic-based binder, a styrene-butadiene rubber, or the like as the binding agent. In addition, it is possible to use, for example, carbon black, artificial graphite, Ketjenblack, acetylene black, carbon fiber, or the like, as the electrical-conductivity additive.

The active-material-containing layer can be formed by dispersing these raw materials in a solvent, such as N-methyl-2-pyrrolidone (NMP), water, or the like, applying such to the surface(s) of the above-mentioned metal foil, and subsequently heating and drying such. It is noted that a thickening agent, such as carboxymethyl cellulose, methylcellulose, or the like, may be used in combination in order to adjust the viscosity of the above-mentioned dispersion.

In addition, if the above-mentioned current collector is to be configured for use as the positive electrode of a lithium-ion secondary battery, then an active material, such as $LiCoO_2$, $LiMn_2O_4$, $LiMnO_2$, $LiNiO_2$, $LiCou_{1/3}Ni_{1/3}Mn_{1/3}$, $LiFePO_4$, or the like, can be used. Substances the same as those used as in the case of a negative electrode described above can be used as the binding agent, the electrical-conductivity additive, the solvent, and the thickening agent.

The above-mentioned current collector can also be used in, in addition to the lithium-ion secondary battery described above, devices such as a sodium secondary battery, an electric double-layer capacitor, a lithium-ion capacitor, and the like. If the above-mentioned current collector is to be used in a device other than a lithium-ion secondary battery, then a well-known active-material-containing layer should be provided on the above-mentioned metal foil in accordance with the device.

WORKING EXAMPLES

Working examples of the above-mentioned current-collector metal foils and the above-mentioned current collectors are explained below. A current-collector metal foil 1 comprises, on both surfaces, numerous recessed parts 4 (refer to FIG. 1 and FIG. 2), each recessed part 4 having a bottom-surface part 2, which is sunken down more than its periphery, and an edge part 3, which surrounds the bottom-surface part 2 and is raised above the bottom-surface part 2.

The current-collector metal foil 1 was prepared by passing, one or more times, the metal foil between a pair of roughening rolls 6 (refer to FIG. 5) prepared in advance, and performing a transfer process in which the contours of the roughening rolls 6 were transferred to the metal foil. Subsequently, the active-material-containing layer was formed on both surfaces of the current-collector metal foil 1, and thereby the current collector was prepared. The configuration and manufacturing method of the current-collector metal foil 1 and the current collector are explained in greater detail below.

Working Example 1

Figure 3:
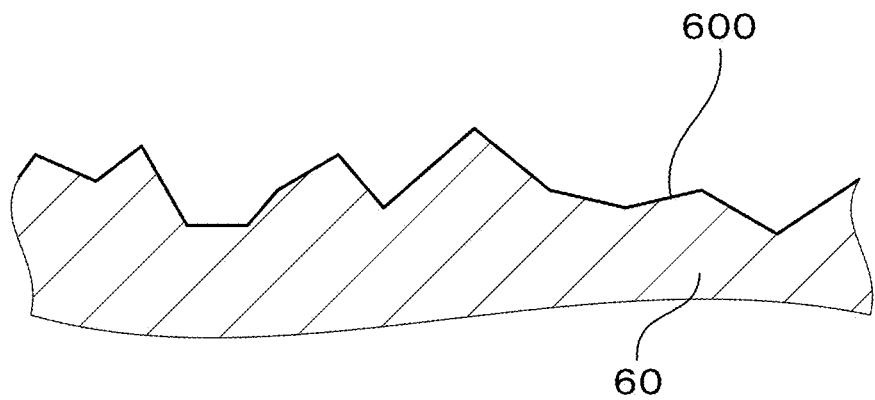
FIG. 3 is a partial cross-sectional view that shows, according to a working example, one example of a rolling-roll surface that has been subjected to a roughening treatment.
Figure 4:
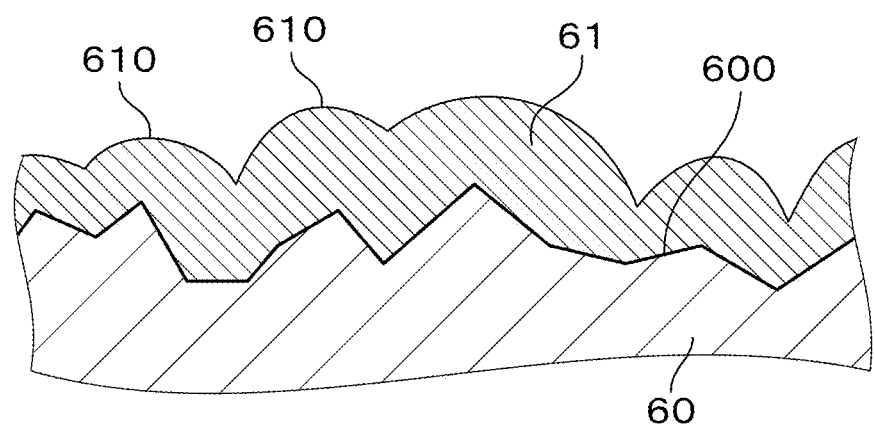
FIG. 4 is a partial cross-sectional view that shows, according to a working example, one example of the rolling-roll surface on which a chrome-plated film has been formed after the roughening treatment.

The pair of roughening rolls 6 was prepared in advance based on the procedure below. First, shot blasting was performed on a pair of rolling rolls 60 using grit-blasting particles having a particle size of 40 μm, and thereby a surface 600 of both rolling rolls 60 was roughened as shown in FIG. 3. Next, a chrome-plating treatment was performed on the surface 600 of each rolling roll 60 to form a chrome-plated film 61. The chrome-plating treatment was performed in a Sargent's bath, containing 250 g/L of chromic anhydride and 2.5 g/L of sulfuric acid, and under the conditions of a temperature of 50° C. and an electric-current density of 30 A/dm². The film thickness of the chrome-plated film 61 was set to 5 μm. As shown in FIG. 4, the chrome-plated film 61 preferentially adhered to the pointed portions of the surface 600, thereby forming numerous protruding parts 610 that are substantially spherically shaped.

Figure 5:
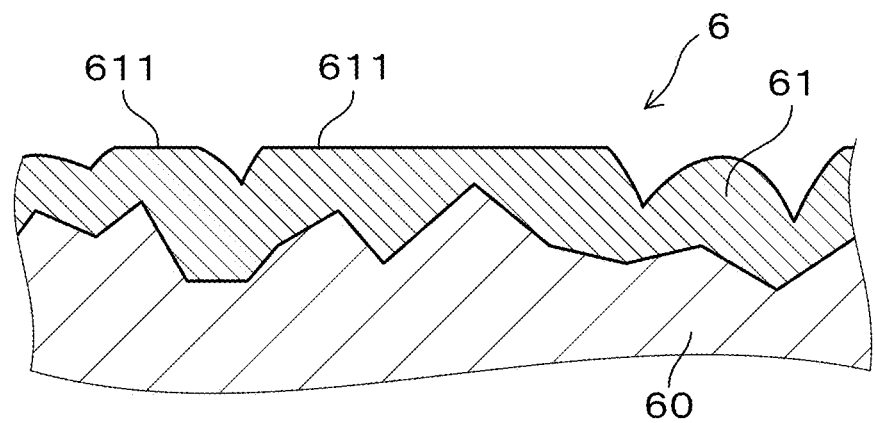
FIG. 5 is a partial cross-sectional view that shows, according to a working example, one example of a surface of a roughening roll that was prepared by flattening peak parts of the chrome-plated film.

Subsequently, the pair of rolling rolls 60, on which the chrome-plated films 61 were formed, was used as work rolls to roll a rolled-copper foil, composed of tough-pitch copper and having a thickness of 10 μm, over a length of 300 m under the condition of a rolling load of 1,300 MPa. Thereby, the peak parts of the protruding parts 610 shown in FIG. 4 were flattened, and thereby flat surfaces 611 were formed as shown in FIG. 5. The roughening rolls 6 were prepared according to the above.

Subsequently, a rolled-copper foil, composed of tough-pitch copper and having a thickness of 10 μm, was passed between the obtained pair of roughening rolls 6, and thereby the contours of the roughening rolls 6 were transferred. Based on the above, metal foil E1 having numerous recessed parts 4 on both surfaces of the rolled-copper foil was obtained. The average Feret diameter $L_{ave}$ of the recessed parts 4 on metal foil E1 was 6.3 μm, and the depth of the deepest recessed parts 4 was 1.9 μm.

It is noted that, in the present application, the depth of each individual recessed part 4 and the maximum depth of the recessed parts 4 were calculated as below. First, the recessed parts 4 were observed at a magnification of 500 times using a laser microscope (the "OLS3000" manufactured by Olympus Corporation), and thereby a sectional profile was obtained. Next, the lowest point of each bottom-surface part 2 and the highest point of each edge part 3 were determined from the obtained sectional profile, and that difference was taken as the depth of each individual recessed part 4. In addition, the maximum value of the depths of recessed parts 4 at ten locations selected randomly was set as the maximum depth of the recessed parts 4.

Working Example 2

A pair of the roughening rolls 6 was prepared the same as in working example 1, excepting that the particle size of the grit-blasting particles and the rolling load in the process of flattening the peak parts of the chrome-plated film 61 were changed to the conditions shown in Table 1. Using the obtained roughening rolls 6, the contours of the roughening rolls 6 were transferred to a rolled-copper foil, having a thickness of 10 μm, based on conditions the same as in working example 1, and thereby metal foil E2 was obtained. The average Feret diameter $L_{ave}$ of the recessed parts 4 on metal foil E2 was 10.1 μm, and the depth of the deepest recessed part 4 was 2.0 μm.

Working Example 3

A pair of the roughening rolls 6 was prepared the same as in working example 1, excepting that the particle size of the grit-blasting particles and the rolling load in the process of flattening the peak parts of the chrome-plated film 61 were changed to the conditions shown in Table 1. Using the obtained roughening rolls 6, the contours of the roughening rolls 6 were transferred to a rolled-copper foil, having a thickness of 10 μm, based on conditions the same as in working example 1, and thereby metal foil E3 was obtained.

Figure 6:
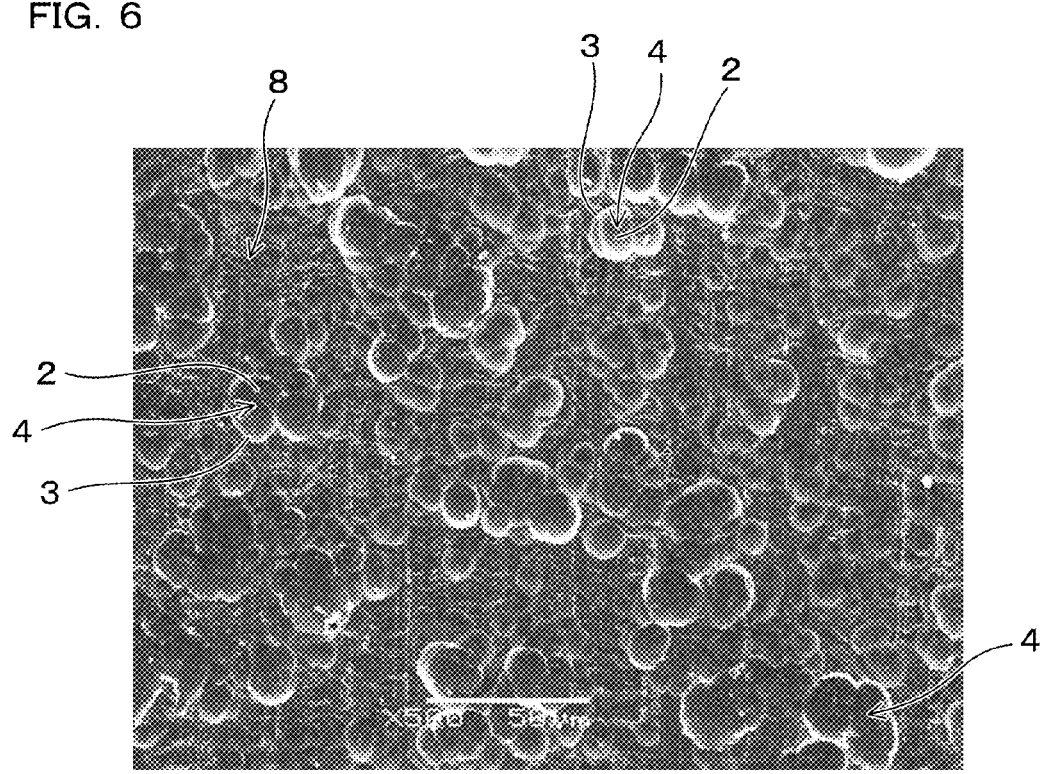
FIG. 6 is an SEM image, according to working example 3, of the surface of metal foil E3 having recessed parts.

FIG. 6 shows, as an example of a metal foil 1 having numerous recessed parts, an SEM (scanning electron microscope) image of the roughened surface of metal foil E3. As can be understood from FIG. 6, numerous recessed parts 4, each having a substantially circular or elliptical shape, or a shape in which these overlap, are formed on the roughened surface of metal foil E3. In addition, it can be understood that, in an area 8 in which the recessed parts 4 are not formed, rolling marks produced during foil rolling, oil pits, and the like are present and the pretransfer shape is maintained.

The average Feret diameter $L_{ave}$ of the recessed parts 4 on metal foil E3 was 22.2 μm, and the depth of the deepest recessed parts 4 was 2.1 μm.

Working Example 4

A pair of the roughening rolls 6 was prepared the same as in working example 1, excepting that the particle size of the grit-blasting particles and the rolling load in the process of flattening the peak parts of the chrome-plated film 61 were changed to the conditions shown in Table 1. Using the obtained roughening rolls 6, the contours of the roughening rolls 6 were transferred to a rolled-copper foil, having a thickness of 10 μm, the same as in working example 1, and thereby metal foil E4 was obtained. The average Feret diameter $L_{ave}$ of the recessed parts 4 on metal foil E4 was 2.4 μm, and the depth of the deepest recessed part 4 was 1.7 μm.

Working Example 5

A pair of the roughening rolls 6 was prepared the same as in working example 1, excepting that the particle size of the grit-blasting particles and the rolling load in the process of flattening the peak parts of the chrome-plated film 61 were changed to the conditions shown in Table 1. Using the obtained roughening rolls 6, the contours of the roughening rolls 6 were transferred to a rolled-copper foil, having a thickness of 10 µm, the same as in working example 1, and thereby metal foil E5 was obtained. The average Feret diameter $L_{ave}$ of the recessed parts 4 on metal foil E5 was 43.0 µm, and the depth of the deepest recessed part 4 was 2.2 µm.

Working Example 6

A pair of the roughening rolls 6 was prepared the same as in working example 1, excepting that the particle size of the grit-blasting particles and the rolling load in the process of flattening the peak parts of the chrome-plated film 61 were changed to the conditions shown in Table 1. Using the obtained roughening rolls 6, the contours of the roughening rolls 6 were transferred to a rolled-copper foil, having a thickness of 10 µm, the same as in working example 1, and thereby metal foil E6 was obtained. The average Feret diameter $L_{ave}$ of the recessed parts 4 on metal foil E6 was 6.3 µm, and the depth of the deepest recessed part 4 was 2.8 µm.

Comparative Example 1

Figure 7:
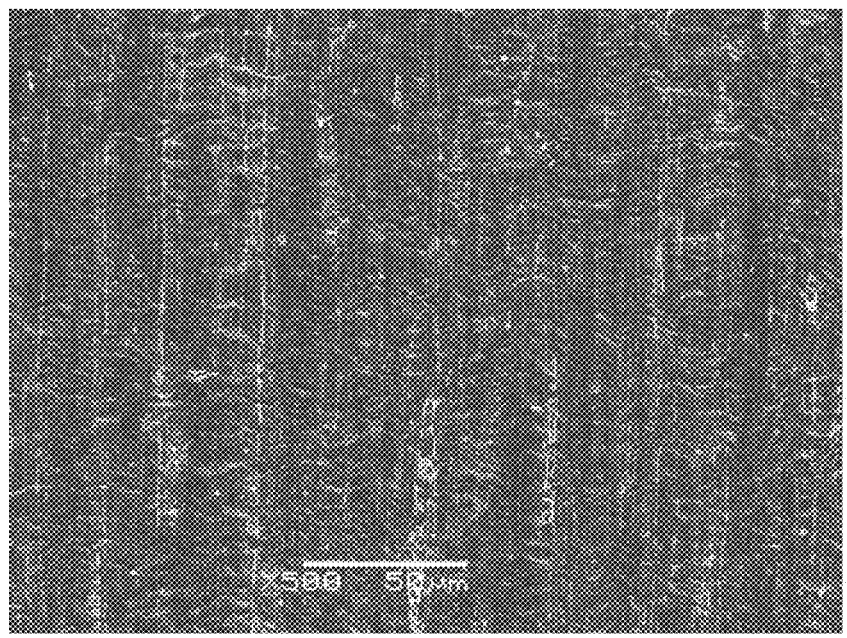
FIG. 7 is an SEM image, according to comparative example 1, of the surface of metal foil C1 that does not have any recessed parts.

As metal foil C1 in comparative example 1, a rolled-copper foil, wherein the contours of the roughening rolls 6 were not transferred, composed of tough-pitch copper and having a thickness of 10 µm was used. As in the SEM image shown in FIG. 7, rolling marks produced during foil rolling and numerous oil pits are present on the surface of metal foil C1, onto which the contours of the roughening rolls 6 were not transferred, and recessed parts 4, which exhibit crater shapes, are not present. It is noted that the depth of the deepest oil pit was 1.2 µm.

Comparative Example 2

A pair of the roughening rolls 6 was prepared the same as in working example 1, excepting that the particle size of the grit-blasting particles and the rolling load in the process of flattening the peak parts of the chrome-plated film 61 were changed to the conditions shown in Table 1. Using the obtained roughening rolls 6, the contours of the roughening rolls 6 were transferred to a rolled-copper foil, having a thickness of 10 µm, the same as in working example 1, and thereby metal foil C2 was obtained. The average Feret diameter $L_{ave}$ of the recessed parts 4 on metal foil C2 was 0.2 µm, and the depth of the deepest recessed part 4 was 1.6 µm.

Comparative Example 3

A pair of the roughening rolls 6 was prepared the same as in working example 1, excepting that the particle size of the grit-blasting particles and the rolling load in the process of flattening the peak parts of the chrome-plated film 61 were changed to the conditions shown in Table 1. Using the obtained roughening rolls 6, the contours of the roughening rolls 6 were transferred to a rolled-copper foil, having a thickness of 10 µm, the same as in working example 1, and thereby metal foil C3 was obtained. The average Feret diameter $L_{ave}$ of the recessed parts 4 on metal foil C3 was 58.2 µm, and the depth of the deepest recessed part 4 was 2.2 µm.

Working Example 7

A pair of roughening rolls 6 was prepared in advance based on the procedure below. First, shot blasting was performed on a pair of rolling rolls 60 using grit-blasting particles having a particle size of 40 and thereby the surface 600 of both rolling rolls 60 was roughened. Next, using the same conditions as in working example 1, the chrome-plating treatment was performed on the surface 600 of each rolling roll 60 to form the chrome-plated film 61. Subsequently, the pair of rolling rolls 60, on which the chrome-plated films 61 were formed, was used as work rolls to roll an electrolytic-copper foil, configured as a battery two-sided glossy foil and having a thickness of 10 µm over a length of 300 m under the condition of a rolling load of 1,300 MPa, and a process was performed in which the peak parts of the protruding parts 610 on the chrome-plated film 61 were flattened. The roughening rolls 6 were prepared based on the above.

Subsequently, an electrolytic-copper foil, configured as a battery two-sided glossy foil and having a thickness of 10 µm, was passed between the obtained pair of roughening rolls 6, and thereby the contours of the roughening rolls 6 were transferred. Based on the above, metal foil E7 having numerous recessed parts 4 on both surfaces of the electrolytic-copper foil was obtained. The average Feret diameter $L_{ave}$ of the recessed parts 4 on metal foil E7 was 6.5 µm, and the depth of the deepest recessed parts 4 was 1.9 µm.

Comparative Example 4

As metal foil C4 in comparative example 4, an electrolytic-copper foil, wherein the contours of the roughening rolls 6 were not transferred, configured as a battery two-sided glossy foil and having a thickness of 10 µm was used. Numerous oil pits are present on the surface of metal foil C4, and the depth of the deepest one was 1.3 µm. It is noted that recessed parts 4, which exhibit crater shapes, are not present on the surface of the metal foil C4.

Working Example 8

A pair of roughening rolls 6 was prepared in advance based on the procedure below. First, shot blasting was performed on a pair of rolling rolls 60 using grit-blasting particles having a particle size of 57 µm, and thereby the surface 600 of both rolling rolls 60 was roughened. Next, using the same conditions as in working example 1, the chrome-plating treatment was performed on the surface 600 of each rolling roll 60 to form the chrome-plated film 61. Subsequently, the pair of rolling rolls 60, on which the chrome-plated films 61 were formed, was used as work rolls to roll an SUS (stainless steel) foil, composed of an SUS304 stainless-steel alloy (hereinbelow, abbreviated as "SUS304 alloy") and having a thickness of over a length of 300 m under the condition of a rolling load of 1,300 MPa, and a process was performed in which the peak parts of the protruding parts 610 on the chrome-plated film 61 were flattened. The roughening rolls 6 were prepared according to the above.

Subsequently, an SUS foil, composed of the SUS304 alloy and having a thickness of 10 µm, was passed between the obtained pair of roughening rolls 6, and thereby the contours of the roughening rolls 6 were transferred. Based on the above, metal foil E8 having numerous recessed parts 4 on both surfaces of the SUS foil was obtained. The average Feret diameter $L_{ave}$ of the recessed parts 4 on metal foil E8 was 8.7 µm, and the depth of the deepest recessed parts 4 was 1.8 µm.

Comparative Example 5

As metal foil C5 in comparative example 5, an SUS foil, wherein the contours of the roughening rolls 6 were not transferred, composed of an SUS304 alloy and having a thickness of 10 µm was used. Numerous oil pits are present on the surface of the metal foil C5, and the depth of the deepest one was 1.3 µm. It is noted that recessed parts 4, which exhibit crater shapes, are not present on the surface of the metal foil C5.

Working Example 9

A pair of roughening rolls 6 was prepared in advance based on the procedure below. First, shot blasting was performed on a pair of rolling rolls 60 using grit-blasting particles having a particle size of 40 µm, and thereby the surface 600 of both rolling rolls 60 was roughened. Next, using the same conditions as in working example 1, the chrome-plating treatment was performed on the surface 600 of each rolling roll 60 to form the chrome-plated film 61. Subsequently, the pair of rolling rolls 60, on which the chrome-plated films 61 were formed, was used as work rolls to roll an Al (aluminum) foil, composed of a JIS A 1235 alloy and having a thickness of 15 µm, over a length of 300 m under the condition of a rolling load of 1,300 MPa, and a process was performed in which the peak parts of the protruding parts 610 on the chrome-plated film 61 were flattened. The roughening rolls 6 were prepared based on the above.

Subsequently, an Al foil, composed of a JIS A 1235 alloy and having a thickness of 15 µm, was passed between the obtained pair of roughening rolls 6, and thereby the contours of the roughening rolls 6 were transferred. Based on the above, metal foil E9 having numerous recessed parts 4 on both surfaces of the Al foil was obtained.

Figure 8:
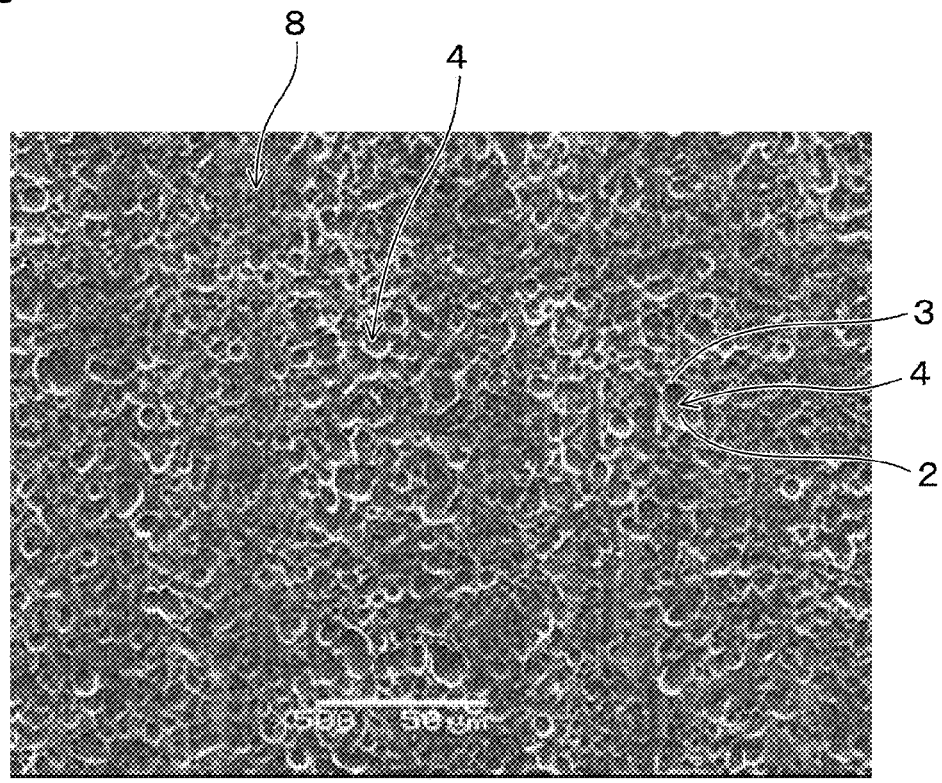
FIG. 8 is an SEM image, according to working example 9, of the surface of metal foil E9 that has recessed parts.

Numerous recessed parts 4, each having a substantially circular or elliptical shape or a shape in which these are linked in a top view, are formed, the same as in the metal foil 3 (FIG. 6), etc., on the roughened surface of metal foil E9 shown in FIG. 8. In addition, it can be understood that, in the area 8 in which the recessed parts 4 are not formed, rolling marks produced during foil rolling, oil pits, and the like are present and the pretransfer shape is maintained.

The average Feret diameter $L_{ave}$ of the recessed parts 4 on metal foil E9 was 5.2 µm, and the depth of the deepest recessed parts 4 was 1.8 µm.

Working Example 10

A pair of the roughening rolls 6 was prepared the same as in working example 9, excepting that the particle size of the grit-blasting particles and the rolling load in the process of flattening the peak parts of the chrome-plated film 61 were changed to the conditions shown in Table 3. Using the obtained roughening rolls 6, the contours of the roughening rolls 6 were transferred to an Al foil, having a thickness of 15 µm, based on conditions the same as in working example 9, and thereby metal foil E10 was obtained. The average Feret diameter $L_{ave}$ of the recessed parts 4 on metal foil E10 was 12.4 µm, and the depth of the deepest recessed part 4 was 2.1 µm.

Working Example 11

A pair of the roughening rolls 6 was prepared the same as in working example 9, excepting that the particle size of the grit-blasting particles and the rolling load in the process of flattening the peak parts of the chrome-plated film 61 were changed to the conditions shown in Table 3. Using the obtained roughening rolls 6, the contours of the roughening rolls 6 were transferred to an Al foil, having a thickness of 15 µm, based on conditions the same as in working example 9, and thereby metal foil E11 was obtained. The average Feret diameter $L_{ave}$ of the recessed parts 4 on metal foil E11 was 24.1 µm, and the depth of the deepest recessed part 4 was 2.1 µm.

Working Example 12

A pair of the roughening rolls 6 was prepared the same as in working example 9, excepting that the particle size of the grit-blasting particles and the rolling load in the process of flattening the peak parts of the chrome-plated film 61 were changed to the conditions shown in Table 3. Using the obtained roughening rolls 6, the contours of the roughening rolls 6 were transferred to an Al foil, having a thickness of 15 µm, based on conditions the same as in working example 9, and thereby metal foil E12 was obtained. The average Feret diameter of the recessed parts 4 on metal foil E12 was 2.3 µm, and the depth of the deepest recessed part 4 was 1.6 µm.

Working Example 13

A pair of the roughening rolls 6 was prepared the same as in working example 9, excepting that the particle size of the grit-blasting particles and the rolling load in the process of flattening the peak parts of the chrome-plated film 61 were changed to the conditions shown in Table 3. Using the obtained roughening rolls 6, the contours of the roughening rolls 6 were transferred to an Al foil, having a thickness of 15 µm, based on conditions the same as in working example 9, and thereby metal foil E13 was obtained. The average Feret diameter $L_{ave}$ of the recessed parts 4 on metal foil E13 was 48.1 and the depth of the deepest recessed part 4 was 2.2 µm.

Comparative Example 6

Figure 9:
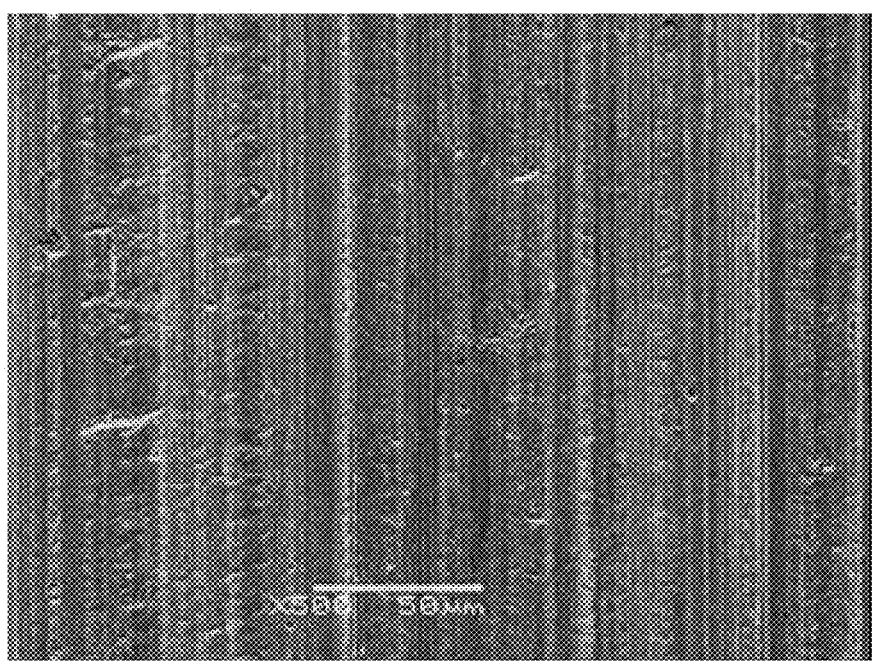
FIG. 9 is an SEM image, according to comparative example 6, of the surface of metal foil C6 that does not have any recessed parts.

As metal foil C6 in comparative example 6, an Al foil, wherein the contours of the roughening rolls 6 were not transferred, composed of tough-pitch copper and having a thickness of 15 µm was used. As in the SEM image shown in FIG. 9, rolling marks produced during foil rolling and numerous oil pits are present on the surface of the metal foil C6, onto which the contours of the roughening rolls 6 were not transferred, and recessed parts 4, which exhibit crater shapes, are not present. It is noted that the depth of the deepest oil pit was 1.2 µm.

Comparative Example 7

A pair of the roughening rolls 6 was prepared the same as in working example 9, excepting that the particle size of the grit-blasting particles and the rolling load in the process of flattening the peak parts of the chrome-plated film 61 were changed to the conditions shown in Table 3. Using the obtained roughening rolls 6, the contours of the roughening rolls 6 were transferred to an Al foil, having a thickness of 15 µm, based on conditions the same as in working example 9, and thereby metal foil C7 was obtained. The average Feret diameter $L_{ave}$ of the recessed parts 4 on metal foil C7 was 0.3 µm, and the depth of the deepest recessed part 4 was 1.6 µm.

Comparative Example 8

A pair of the roughening rolls 6 was prepared the same as in working example 9, excepting that the particle size of the grit-blasting particles and the rolling load in the process of flattening the peak parts of the chrome-plated film 61 were changed to the conditions shown in Table 3. Using the obtained roughening rolls 6, the contours of the roughening rolls 6 were transferred to an A1 foil, having a thickness of 15 µm, based on conditions the same as in working example 9, and thereby current-collector metal foil C8 was obtained. The average Feret diameter $L_{ave}$ of the recessed parts 4 on metal foil C8 was 61.4 µm, and the depth of the deepest recessed part 4 was 2.1 µm.

Working Example 14

A pair of roughening rolls 6 was prepared in advance based on the procedure below. First, shot blasting was performed on a pair of rolling rolls 60 using grit-blasting particles having a particle size of 57 µm, and thereby the surface 600 of both rolling rolls 60 was roughened. Next, using the same conditions as in working example 1, the chrome-plating treatment was performed on the surface 600 of each rolling roll 60 to form the chrome-plated film 61. Subsequently, the pair of rolling rolls 60, on which the chrome-plated films 61 were formed, was used as work rolls to roll an SUS (stainless steel) foil, composed of an SUS304 alloy and having a thickness of 15 µm, over a length of 300 m under the condition of a rolling load of 1,300 MPa, and a process was performed in which the peak parts of the protruding parts 610 on the chrome-plated film 61 were flattened. The roughening rolls 6 were prepared based on the above.

Subsequently, an SUS foil, composed of an SUS304 alloy and having a thickness of 15 µm, was passed between the obtained pair of roughening rolls 6, and thereby the contours of the roughening rolls 6 were transferred. Based on the above, metal foil E14 having numerous recessed parts 4 on both surfaces of the electrolytic-copper foil was obtained. The average Feret diameter $L_{ave}$ of the recessed parts 4 on metal foil E14 was 8.5 µm, and the depth of the deepest recessed parts 4 was 1.8 µm.

Comparative Example 9

As metal foil C9 in comparative example 9, an SUS foil, wherein the contours of the roughening rolls 6 were not transferred, composed of an SUS304 alloy and having a thickness of 15 µm was used. Numerous oil pits are present on the surface of metal foil C9, and the depth of the deepest one was 1.3 µm. It is noted that recessed parts 4, which exhibit crater shapes, are not present on the surface of metal foil C9.

Next, the mechanical characteristics of metal foils E1-E14 and metal foils C1-C9 obtained as described above and the characteristics for the case in which these were used in current collectors will be evaluated.

[Mechanical Characteristics]

Tension tests were performed in accordance with the method stipulated in JIS C 6515:1998, and the tensile strength and elongation of each metal foil were measured. The results are shown in Table 1 and Table 3.

[Negative-Electrode Current Collector Characteristics]

Negative-electrode current collectors (test bodies 1-39) for a lithium-ion secondary battery, which are shown in Table 2, were prepared based on the procedure described below using metal foils E1-E8 and metal foils C1-C5. Subsequently, the electrode resistance of each test body and the charging-discharging-cycles characteristics were evaluated.

(Preparation of Negative-Electrode Current Collectors)

First, three types of negative-electrode-active-material slurries Na, Nb, Nc were prepared by dispersing a negative-electrode active material, a binding agent, and a thickening agent in a solvent. The compositions of the slurries Na, Nb, and Nc were as below. It is noted that the average aggregated particle size of each negative-electrode active material is the value of the particle size (D50) for which, in the particle-size distribution obtained using a laser-diffraction-type, particle-size-distribution measuring apparatus (the "SALD-3100" manufactured by Shimadzu Corporation), the cumulative frequency is 50% by volume percent.

Negative-Electrode-Active-Material Slurry Na

| | |
|---|---|
| Negative-electrode active material: Artificial-graphite powder (average aggregated particle size: 7.2 µm) | 97 parts by mass |
| Binding agent: Styrene-butadiene rubber | 1.5 parts by mass |
| Thickening agent: Carboxymethyl cellulose | 1.5 parts by mass |
| Solvent: Water | |

Negative-Electrode-Active-Material Slurry Nb

| | |
|---|---|
| Negative-electrode active material: Artificial-graphite powder (average aggregated particle size: 13.7 µm) | 97 parts by mass |
| Binding agent: Styrene-butadiene rubber | 1.5 parts by mass |
| Thickening agent: Carboxymethyl cellulose | 1.5 parts by mass |
| Solvent: Water | |

Negative-Electrode-Active-Material Slurry Nc

| | |
|---|---|
| Negative-electrode active material: Artificial-graphite powder (average aggregated particle size: 25.5 µm) | 97 parts by mass |
| Binding agent: Styrene-butadiene rubber | 1.5 parts by mass |
| Thickening agent: Carboxymethyl cellulose | 1.5 parts by mass |
| Solvent: Water | |

Next, test bodies 1-39 shown in Table 2 were prepared by applying one of the slurries Na, Nb, or Nc to one surface of each metal foil and drying such at a temperature of 100° C. for 10 min, thereby forming an active-material-containing layer.

(Test Cells)

Beaker cells were prepared, each beaker cell using lithium metal having an active area of 2.8 cm² (1.4 cm×2.0 cm) as the positive electrode and using a test body having an active area of 2.8 cm² (1.4 cm×2.0 cm) as the negative electrode. It is noted that, as the electrolytic solution, a solution was used that was prepared by dissolving LiPF6 in a solvent, in which ethylene carbonate and diethyl carbonate had been mixed at a volumetric ratio of 1:1, such that the concentration became 1 mol/dm³. In addition, two stacked porous polypropylene sheets, each having a thickness of 480 µm, were disposed as a separator between the positive electrode and the negative electrode. Furthermore, a lithium-metal foil having a thickness of 100 µm was disposed between the two polypropylene sheets at an end-edge part not facing either the positive electrode or the negative electrode. This lithium-metal foil functions as a reference electrode for measuring the polarization state between the negative electrode and the positive electrode.

(Evaluation of Charging-Discharging-Cycles Characteristics)

Using the above-mentioned test cells, cycle tests, in which charging and discharging were repeated for 100 cycles, were performed and the discharge capacity in each cycle was measured. In the first cycle of the cycle test, charging was performed at a constant voltage of 0.0 V until the charging rate reached 0.05 CA, and charging was then performed for 10 hours at a constant electric current in which the charging rate was fixed at 0.1 CA, after which the charging was stopped. Next, discharging was performed at a constant electric current in which the discharge rate was fixed at 0.1 CA, and the discharging was stopped at the point in time at which the cell voltage reached 1.5 V, and thereby the cycle was completed. It is noted that "CA," which is the unit of the charging-discharging rates, is the value obtained by dividing the electric-current value (A) during charging and discharging by the nominal capacity (Ah) of the test cell.

In the cycles subsequent to the second cycle, the charging was performed at a constant voltage of 0.0 V until the charging rate reached 0.05 CA, the charging was then performed for 5 hours at a constant electric current at which the charging rate was fixed at 0.2 CA, after which the charging was stopped. Next, discharging was performed at a constant electric current at which the discharge rate was fixed at 0.2 CA, and the discharging was stopped at the point in time when the cell voltage reached 1.5 V, which completed the cycle.

The capacity maintenance rate was calculated by dividing the discharge capacity of the $100^{th}$ cycle, which was obtained by the above-mentioned cycle test, by the discharge capacity of the first cycle. In addition, after the cycle test was completed, the test cell was disassembled, the test body (the negative-electrode current collector) was removed, and the adherence state of the active-material-containing layer was observed visually. These results are shown in Table 2. It is noted that each capacity maintenance rate shown in Table 2 is the value calculated using the discharge capacity per mass of the active-material-containing layer of the negative electrode.

In addition, the symbols shown in the "active-material-containing layer adherence state" column in Table 2 indicate the following states.

A+: The state in which the active-material-containing layer was adhered to the metal foil, and delamination was not seen A: The state in which delamination of the active-material-containing layer was seen, but 80% or more of the initial amount of the active-material-containing layer was adhered to the test body B: The state in which delamination of the active-material-containing layer was seen, but more than half of the initial amount of the active-material-containing layer was adhered to the test body C: The state in which delamination of the active-material-containing layer was seen, and less than half of the initial amount of the active-material-containing layer was adhered to the test body (Electrode-Resistance Measurement)

The balance component and the ohmic component of the internal resistance of each negative-electrode current collector were separated using the current-rest method. The electrode reaction resistance, the diffusion resistance, and the separator ion diffusion were included in the balance component and therefore could not be separated; however, these can be interpreted as factors related to the electrode-reaction rate. In addition, the ohmic component indicates the resistance of the material, the electrolytic solution, and the like, the resistance related to electronic conduction, ionic conduction, and the like, such as the contact resistance of each interface, etc.

In the second cycle of charging and discharging, the discharging time required from the start of discharging until $\frac{1}{10}^{th}$ of the cell capacity was discharged was recorded, the electrode-resistance measurement was performed in the $100^{th}$ cycle of discharging based on the current-rest method using the above-mentioned discharging time, and the balance component and the ohmic component were calculated based on the obtained measurement curves. The results are shown in Table 2.

It is noted that the current-rest method was performed in accordance with the description in "Technique for the Practical Evaluation of Lithium-Ion Batteries and Capacitors" (Shizukuni YADA, Technical Information Society [2006]).

[Positive-Electrode Current Collector Characteristics]

Positive-electrode current collectors (test bodies 41-70) for a lithium-ion secondary battery, which are shown in Table 4, were prepared based on the procedure described below using metal foils E19-E14 and metal foils C6-C9. Subsequently, the electrode resistance of each test body and the charging-discharging-cycles characteristics were evaluated.

(Preparation of Positive-Electrode Current Collectors)

First, three types of positive-electrode-active-material slurries Pa, Pb, Pc were prepared by dispersing a positive-electrode active material, a binding agent, and a thickening agent in a solvent. The compositions of the slurries Pa, Pb, and Pc were as below. It is noted that, the same as in the negative-electrode-active-material, the average aggregated particle size of each positive-electrode active material is the value of the particle size (D50) for which, in the particle-size distribution obtained using a laser-diffraction-type, particle-size-distribution measuring apparatus (the "SALD-3100" manufactured by Shimadzu Corporation), the cumulative frequency is 50% by volume percent.

Positive-Electrode-Active-Material Slurry Pa

| | |
|---|---|
| Positive-electrode active material: Lithium-cobalt-oxide powder (average aggregated particle size: 7.0 μm) | 90 parts by mass |
| Binder: PVDF (polyvinylidene fluoride) | 5 parts by mass |
| Electrical-conductivity additive: Acetylene black | 5 parts by mass |
| Solvent: NMP | |

Positive-Electrode-Active-Material Slurry Pb

| | |
|---|---|
| Positive-electrode active material: Lithium-cobalt-oxide powder (average aggregated particle size: 12.5 μm) | 97 parts by mass |
| Binder: PVDF (polyvinylidene fluoride) | 5 parts by mass |
| Electrical-conductivity additive: Acetylene black | 5 parts by mass |
| Solvent: NMP | |

Positive-Electrode-Active-Material Slurry Pc

| | |
|---|---|
| Positive-electrode active material: Lithium-cobalt-oxide powder (average aggregated particle size: 26.3 μm) | 97 parts by mass |
| Binder: PVDF (polyvinylidene fluoride) | 5 parts by mass |
| Electrical-conductivity additive: Acetylene black | 5 parts by mass |
| Solvent: NMP | |

Next, test bodies 41-70 shown in Table 4 were prepared by applying one of the slurries Pa, Pb, or Pc to one surface of each metal foil and drying such at a temperature of 100° C. for 10 min, thereby forming an active-material-containing layer.

(Test Cells)

Beaker cells were prepared, each beaker cell using a test body having an active area of 2.8 cm$^2$ (1.4 cm×2.0 cm) as the positive electrode and using lithium metal having an active area of 2.8 cm$^2$ (1.4 cm×2.0 cm) as the negative electrode. They were otherwise the same as the test cells used in the evaluation of the negative-electrode current collectors.

(Evaluation of Charging-Discharging-Cycles Characteristics)

Using the above-mentioned test cells, cycle tests, in which charging and discharging were repeated for 100 cycles, were performed and the discharge capacity in each cycle was measured. In the first cycle of the cycle test, charging was performed at a constant voltage of 4.0 V until the charging rate reached 0.05 CA, and the charging was then performed for 10 hours at a constant electric current in which the charging rate was fixed at 0.1 CA, after which the charging was stopped. Next, discharging was performed at a constant electric current in which the discharge rate was fixed at 0.1 CA, and the discharging was stopped at the point in time at which the cell voltage reached 2.5 V, and thereby the cycle was completed.

In the cycles subsequent to the second cycle, charging was performed at a constant electric potential of 4.0 V until the charging rate reached 0.05 CA, the charging was then performed for 5 hours at a constant electric current at which the charging rate was fixed at 0.2 CA, after which the charging was stopped. Next, discharging was performed at a constant electric current at which the discharge rate was fixed at 0.2 CA, and the discharging was stopped at the point in time when the electric potential reached 2.5 V, which completed the cycle.

The capacity maintenance rate was calculated by dividing the discharge capacity of the 100$^{th}$ cycle, which was obtained by the above-mentioned cycle test, by the discharge capacity of the first cycle. In addition, after the cycle test was completed, the test cell was disassembled, the test body (the positive-electrode current collector) was removed, and the adherence state of the active-material-containing layer was observed visually. These results are shown in Table 4.

It is noted that the symbols shown in the "active-material-containing layer adherence state" column in Table 4 are the same as those in Table 2. In addition, the capacity maintenance rate shown in Table 4 is the value calculated by using the discharge capacity per mass of the active-material-containing layer of the negative electrode.

(Electrode-Resistance Measurement)

As in the negative-electrode current collector, the balance component and the ohmic component of the internal resistance of each positive-electrode current collector were separated using the current-rest method. The results are shown in Table 4.

As can be understood from Table 1 and Table 2, in the negative-electrode current collectors (test bodies 1-24) prepared using metal foils E1-E8, in which the average Feret diameter $L_{ave}$ of the recessed parts 4 was 0.5 µm or more and 50 µm or less, virtually no decrease in capacity was seen even when the charging-discharging cycles were repeated, and high capacity maintenance rates were exhibited. In addition, in test bodies 1-24, virtually no delamination of the active-material-containing layer after completion of the cycle test was seen, and superior adherence was exhibited.

Figure 2:
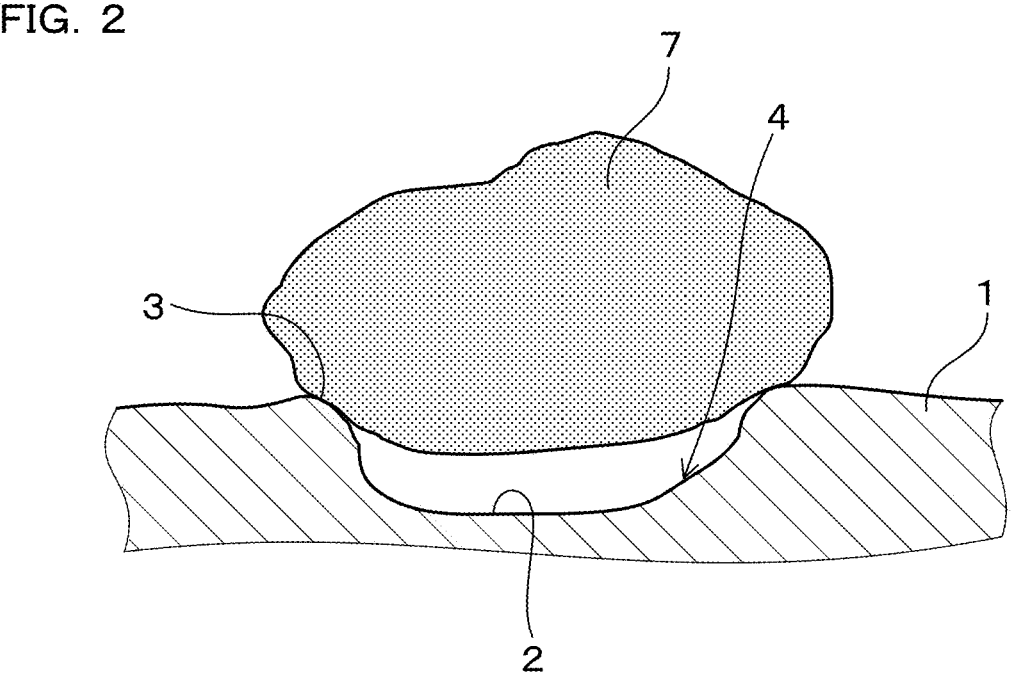
FIG. 2 is a partial auxiliary-cross-sectional view taken along line II-II in FIG. 1.

It is considered that this was caused by the increase in adherence, in the negative-electrode current collectors in which metal foils E1-E8 were used, due to active-material particles 7 being fit in the recessed parts 4. That is, in the negative-electrode current collectors in which metal foils E1-E8 were used, the particle size of the recessed parts 4 and the particle size of the active-material particles 7 were substantially equal, and consequently the active-material particles 7 tended to fit in the recessed parts 4, as shown in FIG. 1 and FIG. 2. Furthermore, the active-material particles 7 fitted in the recessed parts 4 are considered to have high adherence because contacting areas A with the edge parts 3 are formed continuously in a line shape.

In each of the negative-electrode current collectors (test bodies 16-18) in which metal foil E6 was used, the $L_{ave}$ of the recessed parts 4 was within the above-mentioned specific range, and consequently a high capacity maintenance rate as well as satisfactory adherence and low contact resistance of the active-material-containing layer were exhibited. Nevertheless, in metal foil E6, the maximum depth of the recessed parts 4 was large compared with metal foils E1-E5, which were composed of the same material (rolled-copper foil), and consequently problems arose, such as a decrease in elongation, tearing of the foil in the preparing process, and the like. From the viewpoint of avoiding such problems, if the metal foil 1 is to be composed of copper or a copper alloy, then it is more preferable to make the maximum depth of the recessed parts 4 to be 2.5 µm or less. It is noted that metal foil E8 has the same degree of elongation as metal foil E6 but has high strength because it is SUS foil. For that reason, problems such as foil tearing did not occur in metal foil E8.

On the other hand, in the negative-electrode current collectors (test bodies 25-39) in which metal foils C1-C5 were used, capacity markedly decreased owing to repetition of the charging-discharging cycles, low capacity maintenance rates were exhibited, and delamination of the active-material-containing layer after completion of the cycle test was seen.

Figure 10:
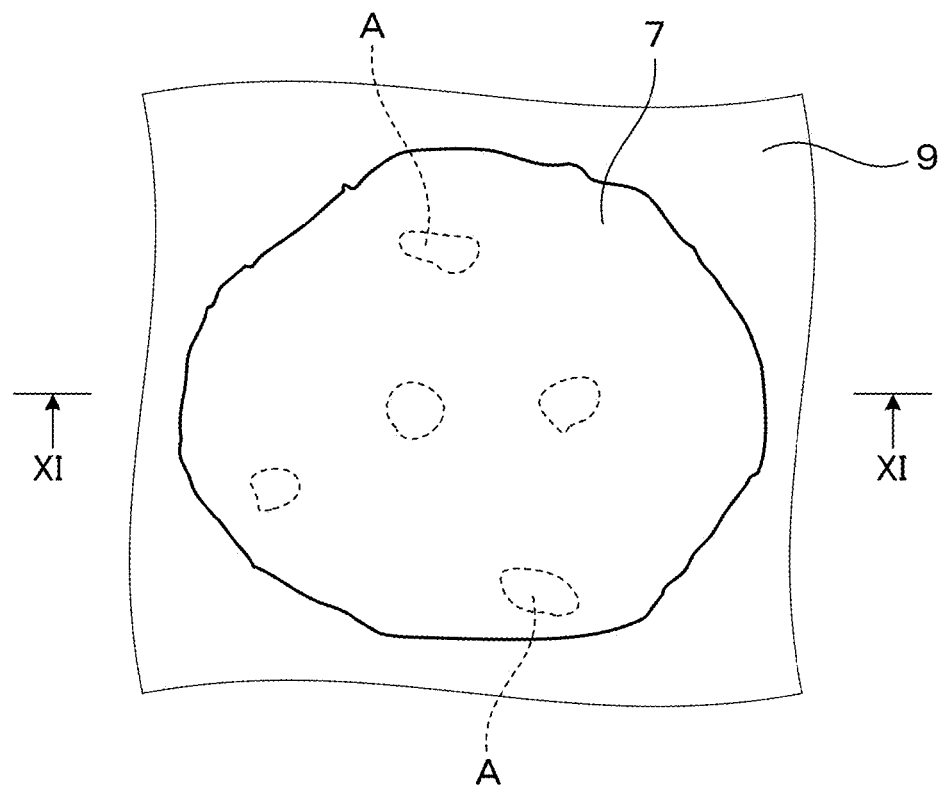
FIG. 10 is a top view that shows, according to a working example, one example of the state in which an active-material particle is adhered to a metal foil that does not have any crater-shaped recessed parts.
Figure 11:
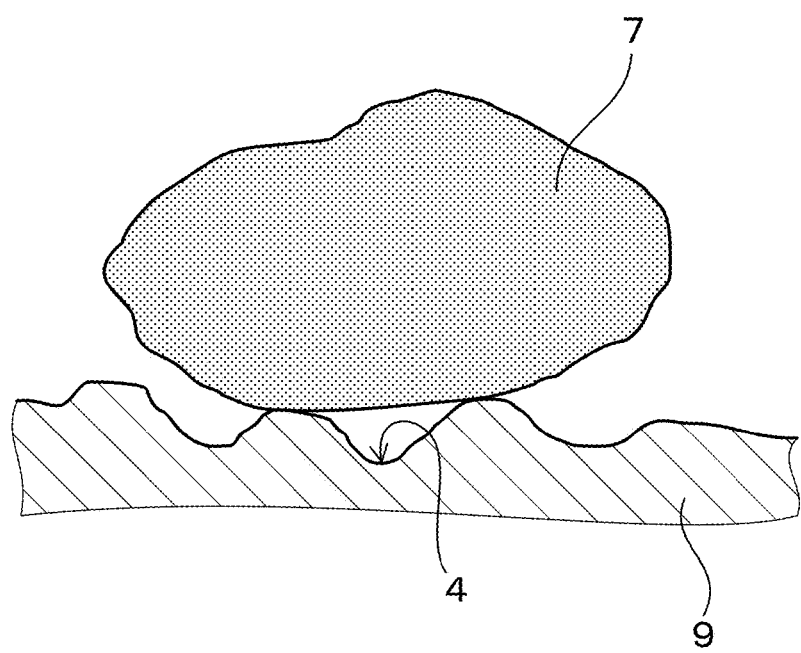
FIG. 11 is a partial auxiliary-cross-sectional view taken along line XI-XI in FIG. 10.

This is considered to be caused by the active-material particles 7 not being fit in the recessed parts 4, because the $L_{ave}$ of the recessed parts 4 in metal foils C1-C5 was outside of the above-mentioned specific range, thereby reducing adherence. That is, as shown in FIG. 10 and FIG. 11, in these metal foils 9, the active-material particles 7 tended not to fit in the recessed parts 4 because the recessed parts 4 were too small relative to the particle size of the active-material particles 7. That is what was considered to be the reason for the low adherence. In addition, in the state shown in FIG. 10 and FIG. 11, it is considered that the contact resistance became high because the contact areas A of the active-material particle 7 with the metal foil 9 are point-shaped.

It is noted that, in the negative-electrode current collectors (test bodies 1-21, test bodies 25-36) in which copper foils were used, no difference was seen in the contact resistance (the ohmic component) between the state in which the recessed parts 4 were absent and the state in which the recessed parts 4 were present. This is considered to be caused by the fact that, because the metal foils were composed of copper having high electrical conductivity, the difference in contact-surface area between the metal foil and the active-material particle 7 did not appear as a difference in the contact resistance.

As can be understood from Table 3 and Table 4, in the positive-electrode current collectors prepared using metal foils E9-E14 and metal foils C6-C9, no marked difference in the capacity maintenance rate after the cycle test and the adherence state of the active-material-containing layer was seen. This is because, in the Al foils and SUS foils, adherence to the active-material-containing layer was high, and consequently no difference was seen between the state in which the recessed parts 4 were absent and the state in which the recessed parts 4 were present.

On the other hand, from the viewpoint of the contact resistance, in metal foils E9-E13, which have an $L_{ave}$ in the above-mentioned specific range, the ohmic component became small compared with metal foils C6-C8 having an $L_{ave}$ outside of the above-mentioned specific range. This was considered to be caused by the fact that the electrical conductivity of Al foils is low compared with that of copper foils, and consequently the difference in contact-surface area between the metal foils and the active-material particles 7 appeared as a difference in the contact resistance (ohmic component). In the positive-electrode current collectors in which metal foils E9-E13 were used, the contact resistance was low, and consequently these positive-electrode current collectors are suited to applications in which charging-discharging rates are set high and high-rate discharging is performed.

TABLE 1

| Metal Foil | Material | Roughening Roll | | Recessed Part | | Mechanical Characteristics | |
|---|---|---|---|---|---|---|---|
| | | Particle Size of Grit-Blasting Particles (μm) | Rolling Load (MPa) | Average Feret Diameter $L_{ave}$ (μm) | Maximum Depth (μm) | Tensile Strength (MPa) | Elongation (%) |
| E1 | Rolled-copper foil | 40 | 1300 | 6.3 | 1.9 | 432 | 1.3 |
| E2 | Rolled-copper foil | 57 | 1200 | 10.1 | 2.0 | 429 | 1.3 |
| E3 | Rolled-copper foil | 69 | 1150 | 22.2 | 2.1 | 427 | 1.2 |
| E4 | Rolled-copper foil | 25 | 1500 | 2.4 | 1.7 | 434 | 1.3 |
| E5 | Rolled-copper foil | 98 | 1100 | 43.0 | 2.2 | 425 | 1.2 |
| E6 | Rolled-copper foil | 40 | 1000 | 6.3 | 2.8 | 426 | 0.5 |
| E7 | Electrolytic-copper foil | 40 | 1300 | 6.5 | 1.9 | 305 | 10.0 |
| E8 | SUS foil | 57 | 1300 | 8.7 | 1.8 | 1050 | 0.4 |
| C1 | Rolled-copper foil | | | Not transferred | | 450 | 1.5 |
| C2 | Rolled-copper foil | 9.5 | 1500 | 0.2 | 1.6 | 430 | 1.2 |
| C3 | Rolled-copper foil | 165 | 1100 | 58.2 | 2.2 | 427 | 1.3 |
| C4 | Electrolytic-copper foil | | | Not transferred | | 320 | 12.0 |
| C5 | SUS foil | | | Not transferred | | 1090 | 0.5 |

TABLE 2

| Test Body | Metal Foil | | Recessed Part | | Active-Material-Containing Layer | | Electrode-Resistance Measurement | | Charging-Discharging-Cycles Characteristics | |
|---|---|---|---|---|---|---|---|---|---|---|
| | Type | Material | Average Feret Diameter $L_{ave}$ (μm) | Maximum Depth (μm) | Slurry Type | Average Secondary-Particle Size of Active Material (μm) | Balance Component (Ω) | Ohmic Component (Ω) | Capacity Maintenance Rate (%) | Adherence State of Active-Material-Containing Layer |
| 1 | E1 | Rolled-copper foil | 6.3 | 1.9 | Na | 7.2 | 2.2 | 2.3 | 98.8 | A+ |
| 2 | E1 | Rolled-copper foil | 6.3 | 1.9 | Nb | 13.7 | 2.3 | 2.2 | 98.5 | A+ |
| 3 | E1 | Rolled-copper foil | 6.3 | 1.9 | Nc | 25.5 | 2.4 | 2.1 | 98.2 | A+ |
| 4 | E2 | Rolled-copper foil | 10.1 | 2.0 | Na | 7.2 | 2.4 | 2.3 | 96.3 | A |
| 5 | E2 | Rolled-copper foil | 10.1 | 2.0 | Nb | 13.7 | 2.4 | 2.2 | 98.0 | A+ |
| 6 | E2 | Rolled-copper foil | 10.1 | 2.0 | Nc | 25.5 | 2.5 | 2.2 | 97.8 | A+ |
| 7 | E3 | Rolled-copper foil | 22.2 | 2.1 | Na | 7.2 | 2.4 | 2.3 | 95.2 | A |
| 8 | E3 | Rolled-copper foil | 22.2 | 2.1 | Nb | 13.7 | 2.6 | 2.3 | 95.8 | A |
| 9 | E3 | Rolled-copper foil | 22.2 | 2.1 | Nc | 25.5 | 2.6 | 2.2 | 97.2 | A |
| 10 | E4 | Rolled-copper foil | 2.4 | 1.7 | Na | 7.2 | 2.8 | 2.3 | 77.6 | B |
| 11 | E4 | Rolled-copper foil | 2.4 | 1.7 | Nb | 13.7 | 2.9 | 2.3 | 77.2 | B |
| 12 | E4 | Rolled-copper foil | 2.4 | 1.7 | Nc | 25.5 | 2.9 | 2.2 | 77.8 | B |
| 13 | E5 | Rolled-copper foil | 43.0 | 2.2 | Na | 7.2 | 2.9 | 2.4 | 76.3 | B |
| 14 | E5 | Rolled-copper foil | 43.0 | 2.2 | Nb | 13.7 | 3.0 | 2.3 | 76.0 | B |
| 15 | E5 | Rolled-copper foil | 43.0 | 2.2 | Nc | 25.5 | 3.0 | 2.3 | 75.7 | B |
| 16 | E6 | Rolled-copper foil | 6.3 | 2.8 | Na | 7.2 | 2.2 | 2.2 | 98.4 | A+ |
| 17 | E6 | Rolled-copper foil | 6.3 | 2.8 | Nb | 13.7 | 2.2 | 2.1 | 98.1 | A+ |
| 18 | E6 | Rolled-copper foil | 6.3 | 2.8 | Nc | 25.5 | 2.3 | 2.1 | 98.0 | A+ |
| 19 | E7 | Electrolytic-copper foil | 6.5 | 1.9 | Na | 7.2 | 2.2 | 2.2 | 98.2 | A+ |
| 20 | E7 | Electrolytic-copper foil | 6.5 | 1.9 | Nb | 13.7 | 2.3 | 2.2 | 98.0 | A+ |
| 21 | E7 | Electrolytic-copper foil | 6.5 | 1.9 | Nc | 25.5 | 2.4 | 2.2 | 97.7 | A+ |
| 22 | E8 | SUS foil | 8.7 | 1.8 | Na | 7.2 | 5.1 | 5.3 | 93.7 | A |
| 23 | E8 | SUS foil | 8.7 | 1.8 | Nb | 13.7 | 5.2 | 5.3 | 93.5 | A |
| 24 | E8 | SUS foil | 8.7 | 1.8 | Nc | 25.5 | 5.2 | 5.3 | 93.1 | A |
| 25 | C1 | Rolled-copper foil | Not transferred | | Na | 7.2 | 3.7 | 2.5 | 48.8 | C |
| 26 | C1 | Rolled-copper foil | Not transferred | | Nb | 13.7 | 3.8 | 2.5 | 46.5 | C |
| 27 | C1 | Rolled-copper foil | Not transferred | | Nc | 25.5 | 3.9 | 2.5 | 44.1 | C |
| 28 | C2 | Rolled-copper foil | 0.2 | 1.6 | Na | 7.2 | 2.8 | 2.2 | 69.2 | C |

TABLE 2-continued

| | | Metal Foil | | | Active-Material-Containing Layer | | Electrode-Resistance Measurement | | Charging-Discharging-Cycles Characteristics | |
|---|---|---|---|---|---|---|---|---|---|---|
| | | | Recessed Part | | | Average Secondary- | | | | |
| Test Body | Type | Material | Average Feret Diameter $L_{ave}$ (μm) | Maximum Depth (μm) | Slurry Type | Particle Size of Active Material (μm) | Balance Component (Ω) | Ohmic Component (Ω) | Capacity Maintenance Rate (%) | Adherence State of Active-Material-Containing Layer |
| 29 | C2 | Rolled-copper foil | 0.2 | 1.6 | Nb | 13.7 | 2.8 | 2.3 | 69.3 | C |
| 30 | C2 | Rolled-copper foil | 0.2 | 1.6 | Nc | 25.5 | 2.8 | 2.1 | 68.8 | C |
| 31 | C3 | Rolled-copper foil | 58.2 | 2.2 | Na | 7.2 | 4.0 | 2.3 | 54.6 | C |
| 32 | C3 | Rolled-copper foil | 58.2 | 2.2 | Nb | 13.7 | 3.9 | 2.2 | 53.7 | C |
| 33 | C3 | Rolled-copper foil | 58.2 | 2.2 | Nc | 25.5 | 3.9 | 2.2 | 53.8 | C |
| 34 | C4 | Electrolytic-copper foil | Not transferred | | Na | 7.2 | 3.8 | 2.8 | 43.5 | C |
| 35 | C4 | Electrolytic-copper foil | Not transferred | | Nb | 13.7 | 4.0 | 2.6 | 42.1 | C |
| 36 | C4 | Electrolytic-copper foil | Not transferred | | Nc | 25.5 | 4.1 | 2.6 | 39.6 | C |
| 37 | C5 | SUS foil | Not transferred | | Na | 7.2 | 10.2 | 7.1 | 36.0 | C |
| 38 | C5 | SUS foil | Not transferred | | Nb | 13.7 | 10.3 | 7.1 | 35.7 | C |
| 39 | C5 | SUS foil | Not transferred | | Nc | 25.5 | 10.5 | 7.1 | 35.0 | C |

TABLE 3

| | | Roughening Roll | | Recessed Part | | Mechanical Characteristics | |
|---|---|---|---|---|---|---|---|
| Metal Foil | Material | Particle Size of Grit-Blasting Particles (μm) | Rolling Load (MPa) | Average Feret Diameter $L_{ave}$ (μm) | Maximum Depth (μm) | Tensile Strength (MPa) | Elongation (%) |
| E9 | Al foil | 40 | 1300 | 5.2 | 1.8 | 177 | 2.6 |
| E10 | Al foil | 57 | 1100 | 12.4 | 2.1 | 175 | 2.6 |
| E11 | Al foil | 69 | 1100 | 24.1 | 2.1 | 172 | 2.3 |
| E12 | Al foil | 25 | 1500 | 2.3 | 1.6 | 178 | 2.6 |
| E13 | Al foil | 98 | 1100 | 48.1 | 2.2 | 170 | 2.4 |
| E14 | SUS foil | 57 | 1300 | 8.5 | 1.8 | 1030 | 0.4 |
| C6 | Al foil | | | Not transferred | | 185 | 3.1 |
| C7 | Al foil | 9.5 | 1500 | 0.3 | 1.6 | 172 | 2.3 |
| C8 | Al foil | 165 | 1100 | 61.4 | 2.1 | 169 | 2.4 |
| C9 | SUS foil | | | Not transferred | | 1070 | 0.5 |

TABLE 4

| | | Metal Foil | | | Active-Material-Containing Layer | | Electrode-Resistance Measurement | | Charging-Discharging-Cycles Characteristics | |
|---|---|---|---|---|---|---|---|---|---|---|
| | | | Recessed Part | | | Average Secondary- | | | | |
| Test Body | Type | Material | Average Feret Diameter $L_{ave}$ (μm) | Maximum Depth (μm) | Slurry Type | Particle Size of Active Material (μm) | Balance Component (Ω) | Ohmic Component (Ω) | Capacity Maintenance Rate (%) | Adherence State of Active-Material-Containing Layer |
| 41 | E9 | Al foil | 5.2 | 1.8 | Pa | 7.0 | 1.4 | 2.3 | 98.6 | A+ |
| 42 | E9 | Al foil | 5.2 | 1.8 | Pb | 12.5 | 1.5 | 2.2 | 98.5 | A+ |
| 43 | E9 | Al foil | 5.2 | 1.8 | Pc | 26.3 | 1.5 | 2.1 | 98.4 | A+ |
| 44 | E10 | Al foil | 12.4 | 2.1 | Pa | 7.0 | 1.6 | 2.3 | 98.3 | A+ |
| 45 | E10 | Al foil | 12.4 | 2.1 | Pb | 12.5 | 1.6 | 2.3 | 98.3 | A+ |
| 46 | E10 | Al foil | 12.4 | 2.1 | Pc | 26.3 | 1.7 | 2.2 | 98.2 | A+ |
| 47 | E11 | Al foil | 24.1 | 2.0 | Pa | 7.0 | 1.6 | 2.2 | 98.1 | A+ |
| 48 | E11 | Al foil | 24.1 | 2.1 | Pb | 12.5 | 1.7 | 2.3 | 98.0 | A+ |
| 49 | E11 | Al foil | 24.1 | 2.0 | Pc | 26.3 | 1.7 | 2.3 | 98.0 | A+ |
| 50 | E12 | Al foil | 2.3 | 1.6 | Pa | 7.0 | 2.3 | 2.9 | 98.3 | A+ |
| 51 | E12 | Al foil | 2.3 | 1.6 | Pb | 12.5 | 2.4 | 3.0 | 98.2 | A+ |
| 52 | E12 | Al foil | 2.3 | 1.6 | Pc | 26.3 | 2.5 | 3.1 | 98.2 | A+ |
| 53 | E13 | Al foil | 48.1 | 2.1 | Pa | 7.0 | 2.4 | 3.0 | 98.0 | A+ |
| 54 | E13 | Al foil | 48.1 | 2.2 | Pb | 12.5 | 2.6 | 3.1 | 98.1 | A+ |
| 55 | E13 | Al foil | 48.1 | 2.1 | Pc | 26.3 | 2.7 | 3.1 | 97.9 | A |
| 56 | E14 | SUS foil | 8.5 | 1.8 | Pa | 7.0 | 3.5 | 5.2 | 97.6 | A |

TABLE 4-continued

| | Metal Foil | | | | Active-Material-Containing Layer | | Electrode-Resistance Measurement | | Charging-Discharging-Cycles Characteristics | |
|---|---|---|---|---|---|---|---|---|---|---|
| | | | Recessed Part | | | | | | | |
| Test Body | Type | Material | Average Feret Diameter $L_{ave}$ (μm) | Maximum Depth (μm) | Slurry Type | Average Secondary-Particle Size of Active Material (μm) | Balance Component (Ω) | Ohmic Component (Ω) | Capacity Maintenance Rate (%) | Adherence State of Active-Material Containing Layer |
| 57 | E14 | SUS foil | 8.5 | 1.8 | Pb | 12.5 | 3.5 | 5.3 | 97.5 | A |
| 58 | E14 | SUS foil | 8.5 | 1.8 | Pc | 26.3 | 3.6 | 5.2 | 97.5 | A |
| 59 | C6 | Al foil | Not transferred | | Pa | 7.0 | 3.3 | 3.9 | 97.3 | A |
| 60 | C6 | Al foil | Not transferred | | Pb | 12.5 | 3.3 | 4.0 | 97.5 | A |
| 61 | C6 | Al foil | Not transferred | | Pc | 26.3 | 3.4 | 4.1 | 97.3 | A |
| 62 | C7 | Al foil | 0.3 | 1.6 | Pa | 7.0 | 3.0 | 3.4 | 97.5 | A |
| 63 | C7 | Al foil | 0.3 | 1.6 | Pb | 12.5 | 2.9 | 3.5 | 97.6 | A |
| 64 | C7 | Al foil | 0.3 | 1.6 | Pc | 26.3 | 3.0 | 3.4 | 97.6 | A |
| 65 | C8 | Al foil | 61.4 | 2.0 | Pa | 7.0 | 3.2 | 3.6 | 97.4 | A |
| 66 | C8 | Al foil | 61.4 | 2.1 | Pb | 12.5 | 3.2 | 3.6 | 97.3 | A |
| 67 | C8 | Al foil | 61.4 | 2.0 | Pc | 26.3 | 3.2 | 3.5 | 97.3 | A |
| 68 | C9 | SUS foil | Not transferred | | Pa | 7.0 | 5.0 | 7.8 | 96.6 | A |
| 69 | C9 | SUS foil | Not transferred | | Pb | 12.5 | 5.1 | 7.8 | 96.4 | A |
| 70 | C9 | SUS foil | Not transferred | | Pc | 26.3 | 5.1 | 8.0 | 96.5 | A |

The invention claimed is:

1. A method for shaping a metal foil for use as a current collector of a battery, comprising:
    forming a roughened surface on at least a first roll,
    plating a chrome-plate film on the roughened surface of the first roll,
    flattening peak parts of protruding parts on the chrome-plated film to form flat surfaces on the protruding parts, and
    passing the metal foil between a pair of rolls, at least one of which is the first roll, to transfer a contour of the first roll to a first surface of the metal foil, thereby forming recesses in the first surface of the metal foil,
    wherein the protruding parts having the flat surfaces on the first roll are configured such that:
    (i) after passing the metal foil between the pair of rolls, the recesses in the first surface of the metal foil have an average Feret diameter $L_{ave}$ of 0.5 μm or more and 50 μm or less, and
    (ii) a maximum depth of the recesses in the first surface of the metal foil is 2.5 μm or less and is less than the average Feret diameter $L_{ave}$ of the recesses in the first surface of the metal foil.

2. The method according to claim 1, wherein:
    the roughened surface is formed by one of a mechanical method, a chemical method, or a physical method,
    after plating the chrome-plate film and before flattening, the peak parts each have a substantially spherical shape, and
    the substantially spherical shapes of the peak parts are flattened to form the flat surfaces by rolling the first roll with a load applied, thereby smashing the substantially spherical shapes.

3. The method according to claim 1, wherein the protruding parts having the flat surfaces on the first roll are configured such that, after passing the metal foil between the pair of rolls, 90% or more of the recesses in the first surface of the metal foil have a depth of 0.5 μm or more.

4. The method according to claim 1, further comprising:
    forming a roughened surface on a second roll,
    plating a chrome-plate film on the roughened surface of the second roll, and
    flattening peak parts of protruding parts on the chrome-plated film of the second roll to form flat surfaces on the protruding parts,
    wherein the metal foil is passed between the first and second rolls to transfer the contour of the first roll to the first surface of the metal foil and to transfer a contour of the second roll to a second surface of the metal foil, thereby forming recesses in the first and second surfaces of the metal foil, and
    the protruding parts having the flat surfaces on the second roll are configured such that, after passing the metal foil between the first and second rolls, the recesses in the second surface of the metal foil also have an average Feret diameter $L_{ave}$ of 0.5 μm or more and 50 μm or less and a maximum depth of 2.5 μm or less.

5. The method according to claim 1, wherein the metal foil has a thickness of 5-35 μm.

6. The method according to claim 1, wherein the metal foil has a thickness of 8-18 μm.

7. The method according to claim 1, wherein the metal foil is composed of copper or a copper alloy.

8. The method according to claim 1, wherein the metal foil is composed of aluminum or an aluminum alloy.

9. The method according to claim 1, wherein the protruding parts having the flat surfaces on the first roll are configured such that, after passing the metal foil between the pair of rolls, 30-90% of a surface area of the metal foil is occupied by bottom surfaces of the recesses in the first surface of the metal foil.

10. The method according to claim 1, further comprising:
    after passing the metal foil between the pair of rolls, applying an active material to at least the first surface of the metal foil, the active material having an average aggregated particle size $d_{ave}$ of 0.5 μm or more and 50 μm or less.

11. The method according to claim 10, wherein the average aggregated particle size $d_{ave}$ of the active material is equal to or greater than the average Feret diameter $L_{ave}$ of the recesses in the first surface of the metal foil.

12. The method according to claim 11, wherein the active material is composed of a material selected from the group consisting of silicon, tin, germanium, and oxides or alloys thereof; a carbon material; and lithium titanate.

13. The method according to claim 11, wherein the active material is composed of a material selected from the group consisting of $LiCoO_2$, $LiMn_2O_4$, $LiMnO_2$, $LiNiO_2$, $LiCo_{1/3}Ni_{1/3}Mn_{1/3}$, and $LiFePO_4$.

14. The method according to claim 4, wherein the protruding parts having the flat surfaces on the first roll and on the second roll are configured such that, after passing the metal foil between the first and second rolls:
- 30-90% of a surface area of the metal foil is occupied by bottom surfaces of the recesses in the first and second surfaces of the metal foil.

15. The method according to claim 14, wherein:
- the metal foil has a thickness of 8-18 μm; and
- the metal foil is composed of copper, a copper alloy, aluminum or an aluminum alloy.

* * * * *